United States Patent
Dong et al.

(10) Patent No.: US 12,335,099 B2
(45) Date of Patent: Jun. 17, 2025

(54) ENHANCED RECONFIGURABLE INTERCONNECT NETWORK

(71) Applicant: Google LLC, Mountain View, CA (US)

(72) Inventors: Xiangyu Dong, San Jose, CA (US); Jianqiao Liu, Basking Ridge, NJ (US)

(73) Assignee: Google LLC, Mountain View, CA (US)

( * ) Notice: Subject to any disclaimer, the term of this patent is extended or adjusted under 35 U.S.C. 154(b) by 1147 days.

(21) Appl. No.: 17/110,867

(22) Filed: Dec. 3, 2020

(65) Prior Publication Data

US 2022/0121928 A1 Apr. 21, 2022

Related U.S. Application Data

(60) Provisional application No. 63/093,672, filed on Oct. 19, 2020.

(51) Int. Cl.
*H04L 41/12* (2022.01)
*G06N 3/04* (2023.01)
(Continued)

(52) U.S. Cl.
CPC ............. *H04L 41/12* (2013.01); *G06N 3/04* (2013.01); *G06N 3/08* (2013.01); *H04L 41/0803* (2013.01); *H04L 41/0893* (2013.01); *H04L 49/15* (2013.01)

(58) Field of Classification Search
CPC ........ G06N 3/08; G06N 3/04; H04L 41/0803; H04L 41/0893; H04L 41/12; H04L 49/15; H04L 49/25
See application file for complete search history.

(56) References Cited

U.S. PATENT DOCUMENTS 4,910,665 A 3/1990 Mattheyses et al.
5,689,661 A 11/1997 Hayashi et al.
(Continued)

FOREIGN PATENT DOCUMENTS

BR 112018002502 A2 9/2018
BR 112015009668 10/2021
(Continued)

OTHER PUBLICATIONS

Jones et al., "Simulation of large-scale HPC architectures," Parallel Processing Workshops, Sep. 13, 2011, pp. 447-456.
(Continued)

*Primary Examiner* — Tonia L Dollinger
*Assistant Examiner* — Joseph M Cousins
(74) *Attorney, Agent, or Firm* — Fish & Richardson P.C.

(57) ABSTRACT

Methods, systems, and apparatus, including computer programs encoded on a computer storage medium, for an enhanced reconfigurable interconnect network. The reconfigurable interconnect network can be used to switch between multiple different connection topologies for different sizes of subsets of processing nodes in a cluster. For example, for a given number of processing nodes to be used, different connection topologies can provide different levels of scalability, data transfer bandwidth among processing nodes, and latency for transfers among processing nodes. In some implementations, the connection topologies can assign connections for each of the data ports of the processing nodes used, to maximize utilization of the data ports and provide better performance.

19 Claims, 11 Drawing Sheets

(51) Int. Cl.
*G06N 3/08* (2023.01)
*H04L 41/0803* (2022.01)
*H04L 41/0893* (2022.01)
*H04L 49/15* (2022.01)

(56) References Cited

U.S. PATENT DOCUMENTS

| | | |
|---|---|---|
| 6,230,252 B1 | 5/2001 | Passint |
| 6,718,428 B2 | 4/2004 | Lee et al. |
| 7,555,566 B2 | 6/2009 | Blumrich et al. |
| 7,873,811 B1 | 1/2011 | Wolinski et al. |
| 8,159,973 B2 | 4/2012 | Deng |
| 8,306,042 B1 | 11/2012 | Abta |
| 8,341,381 B2 | 12/2012 | Pechanek |
| 9,590,629 B2 | 3/2017 | Nicol |
| 9,712,629 B2 | 7/2017 | Molettiere et al. |
| 10,318,973 B2 | 6/2019 | Milton et al. |
| 10,374,605 B2 | 8/2019 | Nicol |
| 10,430,375 B2 | 10/2019 | Ajinna |
| 10,644,943 B1 | 5/2020 | Sidebottonn |
| 10,985,990 B2 | 4/2021 | Zhang et al. |
| 11,516,087 B2 | 11/2022 | Towles |
| 2002/0069343 A1 | 6/2002 | Pechanek |
| 2002/0109879 A1 | 8/2002 | Wing So |
| 2002/0176648 A1 | 11/2002 | Bhat |
| 2003/0023749 A1 | 1/2003 | Lee |
| 2003/0046512 A1 | 3/2003 | Loki et al. |
| 2003/0088754 A1 | 5/2003 | Barry |
| 2003/0130833 A1 | 7/2003 | Brownell et al. |
| 2003/0202530 A1 | 10/2003 | Jenkins et al. |
| 2004/0004963 A1 | 1/2004 | Mehra |
| 2004/0103218 A1 | 5/2004 | Blunnrich |
| 2004/0168040 A1 | 8/2004 | Pechanek |
| 2004/0172531 A1 | 9/2004 | Little et al. |
| 2004/0210693 A1 | 10/2004 | Zeitler et al. |
| 2005/0132163 A1 | 6/2005 | Stockmeyer |
| 2005/0195488 A1 | 9/2005 | McCabe |
| 2006/0109842 A1 | 5/2006 | Thiele |
| 2006/0126521 A1 | 6/2006 | Hyndman et al. |
| 2007/0086450 A1 | 4/2007 | Baumer et al. |
| 2008/0031238 A1 | 4/2008 | Harnnelin |
| 2009/0094436 A1 | 4/2009 | Deng |
| 2009/0259713 A1 | 10/2009 | Blumrich et al. |
| 2012/0020242 A1 | 1/2012 | McLaren et al. |
| 2012/0109830 A1 | 5/2012 | Vogel |
| 2012/0311299 A1 | 12/2012 | Blunnrich |
| 2013/0019082 A1 | 1/2013 | Pechanek |
| 2014/0098702 A1 | 4/2014 | Fricker |
| 2014/0181573 A1 | 6/2014 | Goss |
| 2014/0307556 A1 | 10/2014 | Zhang |
| 2014/0321324 A1 | 10/2014 | Beshai |
| 2014/0362730 A1 | 12/2014 | Zhang et al. |
| 2015/0172218 A1 | 6/2015 | Beshai |
| 2015/0256410 A1 | 9/2015 | Beshai |
| 2016/0087956 A1 | 3/2016 | Maheshwari et al. |
| 2016/0191301 A1 | 6/2016 | Li |
| 2017/0099190 A1 | 4/2017 | Pitwon |
| 2017/0104625 A1* | 4/2017 | Chen ............... H04L 67/10 |
| 2017/0364702 A1 | 12/2017 | Goldfarb |
| 2017/0366416 A1 | 12/2017 | Beecham |
| 2017/0366469 A1 | 12/2017 | Lagerholnn |
| 2018/0054475 A1 | 2/2018 | Agarwal |
| 2018/0109955 A1 | 4/2018 | Nixon et al. |
| 2018/0152317 A1 | 5/2018 | Chang et al. |
| 2018/0176078 A1* | 6/2018 | Nigro ............. H04L 67/303 |
| 2018/0205640 A1 | 7/2018 | Zhang |
| 2018/0255123 A1* | 9/2018 | Desai .............. H04L 67/1008 |
| 2018/0300181 A1* | 10/2018 | Hetzel .............. G06F 9/5055 |
| 2018/0367652 A1 | 12/2018 | Dixit |
| 2019/0266790 A1 | 8/2019 | Song |
| 2019/0286440 A1 | 9/2019 | Leonard |
| 2019/0364009 A1 | 11/2019 | Joseph |
| 2020/0110591 A1 | 4/2020 | Buczkowski |
| 2020/0160171 A1 | 5/2020 | Rangarajan et al. |
| 2020/0186607 A1 | 6/2020 | Murphy |
| 2020/0220787 A1 | 7/2020 | Chen |
| 2020/0301943 A1 | 9/2020 | Robinson et al. |
| 2020/0311017 A1 | 10/2020 | Knowles |
| 2020/0403985 A1 | 12/2020 | Mahadevan |
| 2020/0404076 A1 | 12/2020 | Mahadevan |
| 2021/0058388 A1 | 2/2021 | Knotwell et al. |
| 2021/0110247 A1* | 4/2021 | Venkataramani ... G06F 11/3414 |
| 2021/0111959 A1 | 4/2021 | Shahriar |
| 2021/0152494 A1 | 5/2021 | Johnsen et al. |
| 2021/0159659 A1 | 5/2021 | Bandyopadhyay |
| 2021/0160318 A1 | 5/2021 | Sajeepa |
| 2021/0314404 A1 | 10/2021 | Glek |
| 2021/0344618 A1 | 11/2021 | Zheng |
| 2022/0173973 A1 | 6/2022 | Towles |
| 2023/0239245 A1 | 7/2023 | Yamagishi et al. |

FOREIGN PATENT DOCUMENTS

| | | | |
|---|---|---|---|
| CN | 107971830 B | 4/2022 | |
| DE | 10-2020-125219 | 6/2021 | |
| EP | 3062233 | 8/2016 | |
| EP | 3346424 A1 * | 7/2018 | ......... G06F 13/4022 |
| JP | 3980488 | 9/2007 | |
| NL | 2023381 B1 | 2/2021 | |
| WO | WO 1990926429 | 5/1999 | |
| WO | WO 2004021643 | 3/2004 | |
| WO | WO 2008157499 | 12/2008 | |
| WO | WO 2011/140028 | 11/2011 | |
| WO | WO 2015176243 | 3/2016 | |
| WO | WO 2019094729 | 5/2019 | |
| WO | WO 2020/112992 | 6/2020 | |
| WO | WO-2020112992 A1 * | 6/2020 | ......... G06F 15/7867 |
| WO | WO 2020180387 | 9/2020 | |
| WO | WO 2021067230 A1 | 4/2021 | |

OTHER PUBLICATIONS

Office Action in European Appln. No. 21199230.0, dated Feb. 28, 2023, 7 pages.

Ammendola et al., "APEnet+: a 3D Torus network optimized for GPU-based HPC Systems," Journal of Physics: Conference Series, 2012, 396(4)042059.

Andújar et al., "A case study on implementing virtual 5d torus networks using network components of lower dimensionality," 2017 IEEE 3rd International Workshop on High-Performance Interconnection Networks in the Exascale and Big-Data Era (HiPINEB), Feb. 2017, 9-16.

Camara et al., "Twisted torus topologies for enhanced interconnection networks," IEEE Transactions on Parallel and Distributed Systems, Feb. 2010, 21(12):1765-78.

Chen et al., "OSA: An Optical Switching Architecture for Data Center Networks with Unprecedented Flexibility," IEEE/ACM Transactions on Networking (TON), 2014, 498-511.

ClusterDesign.org [online], "Torus interconnect," retrieved on Dec. 14, 2020, retrieved from URL <https://clusterdesign.org/torus/t>.

Datasys.cs.iit.edu [online], "Understanding Torus Network Performance through Simulations," retrieved on Dec. 14, 2020, retrieved from URL <http://datasys.cs.iit.edu/reports/2014_GCASR14_poster-torus.pdf>, 3 pages.

Farrington et al., "Helios: a hybrid electrical/optical switch architecture for modular data centers," Proceedings of the ACM SIGCOMM 2010 conference, Aug. 2010, 30:339-350.

George et al., "Novo-G#: Large-scale reconfigurable computing with direct and programmable interconnects," 2016 IEEE High Performance Extreme Computing Conference (HPEC), Sep. 2016, 1-7.

Grani et al., "Simultaneous optical path-setup for reconfigurable photonic networks in tiled CMPS," 2014 IEEE Intl Conf on High Performance Computing and Communications, Aug. 2014, 482-485.

Gulzari et al., "A new cross-by-pass-torus architecture based on CBP-mesh and torus interconnection for on-chip communication," PloS one, Dec. 2016, 11(12):e0167590.

(56) References Cited

OTHER PUBLICATIONS

Halperin et al., "Augmenting data center networks with multi-gigabit wireless links," Proceedings of the ACM SIGCOMM 2011 conference, Aug. 2011, 38-49.

Hamedazimi et al., "Firefly: A reconfigurable wireless data center fabric using free-space optics," Proceedings of the 2014 ACM conference on SIGCOMM, Aug. 2014, 319-330.

Jha et al., "Hamiltonian decomposition of the rectangular twisted torus," IEEE Transactions on Parallel and Distributed Systems, Dec. 2011, 23(8):1504-7.

Jha et al., "Dense bipartite circulants and their routing via rectangular twisted torus," Discrete Applied Mathematics, Mar. 2014, 166:141-58.

Lawande et al., "Novo-G#: a multidimensional torus-based reconfigurable cluster for molecular dynamics," Concurrency and Computation: Practice and Experience, Jun. 2016, 28(8):2374-93.

Legtchenko et al., "XFabric: A reconfigurable in-rack network for rack-scale computers," 13th {USENIX} Symposium on Networked Systems Design and Implementation, 2016, 15-29.

m.blog.naver.com [online], "Torus Networks Design," Jul. 2015, retrieved on Dec. 14, 2020, retrieved from URL <https://m.blog.naver.com/PostView.nhn?blogId=framkang&logNo=220414173133&proxyReferer=https:%2F%2Fwww.google.com%2F>, 15 pages.

Parhami et al., "Comparing four classes of torus-based parallel architectures: Networkparameters and communication performance," Mathematical and computer modelling, Oct. 2004, 40(7-8):701-20.

Porter et al., "Integrating microsecond circuit switching into the data center," ACM SIGCOMM Computer Communication Review, Aug. 2013, 43(4):447-58.

Shafarenko et al., "An adaptive, reconfigurable interconnect for computational clusters," Proceedings First IEEE/ACM International Symposium on Cluster Computing and the Grid, May 2001, 229-236.

Shalf et al., "Analyzing ultra-scale application communication requirements for a reconfigurable hybrid interconnect," SC'05: Proceedings of the 2005 ACM/IEEE Conference on Supercomputing, Nov. 2005, 17-17.

Vallejo et al., "Peripheral twists for torus topologies with arbitrary aspect ratio," Actas XXII Jornadas de Paralelismo, 2011, 421-426.

Wang et al., "c-Through: Part-time optics in data centers," Proceedings of the ACM SIGCOMM 2010 conference, Aug. 2010, 327-338.

Wikipedia.org [online], "Tensor Processing Unit," retrieved on Dec. 14, 2020 retrieved from URL <https://en.wikipedia.org/wiki/Tensor_Processing_Unit>, 6 pages.

Wikipedia.org [online], "Torus interconnect," retrieved on Dec. 14, 2020 retrieved from URL < https://en.wikipedia.org/wiki/Torus_interconnect >, 5 pages.

Xu et al., "Petersen-Twisted-Torus Networks for Multiprocessor Systems," J. Convergence Inf. Technol . . . , Nov. 2010, 5(9):200-5.

Extended European Search Report in European Application No. 21199230.0, dated Mar. 28, 2022, 12 pages.

Extended European Search Report in European Application No. 21199227.6, dated Apr. 4, 2022, 11 pages.

Zhang et al., "Defect tolerance in homogeneous manycore processors using core-level redundancy with unified topology" EDAA, 2008, 6 pages.

Ortin-Obon et al., "Analysis of network-on-chip topologies for cost-efficient chip multiprocessors" Microprocessors and Microsystems, 2016, 24-36.

Office Action in European Appln. No. 21199230.0, mailed on Feb. 27, 2024, 10 pages.

Extended European Search Report in European Appln. No. 24205792.5, mailed on Nov. 26, 2024, 12 pages.

* cited by examiner

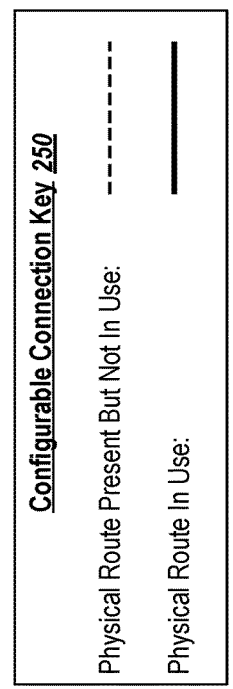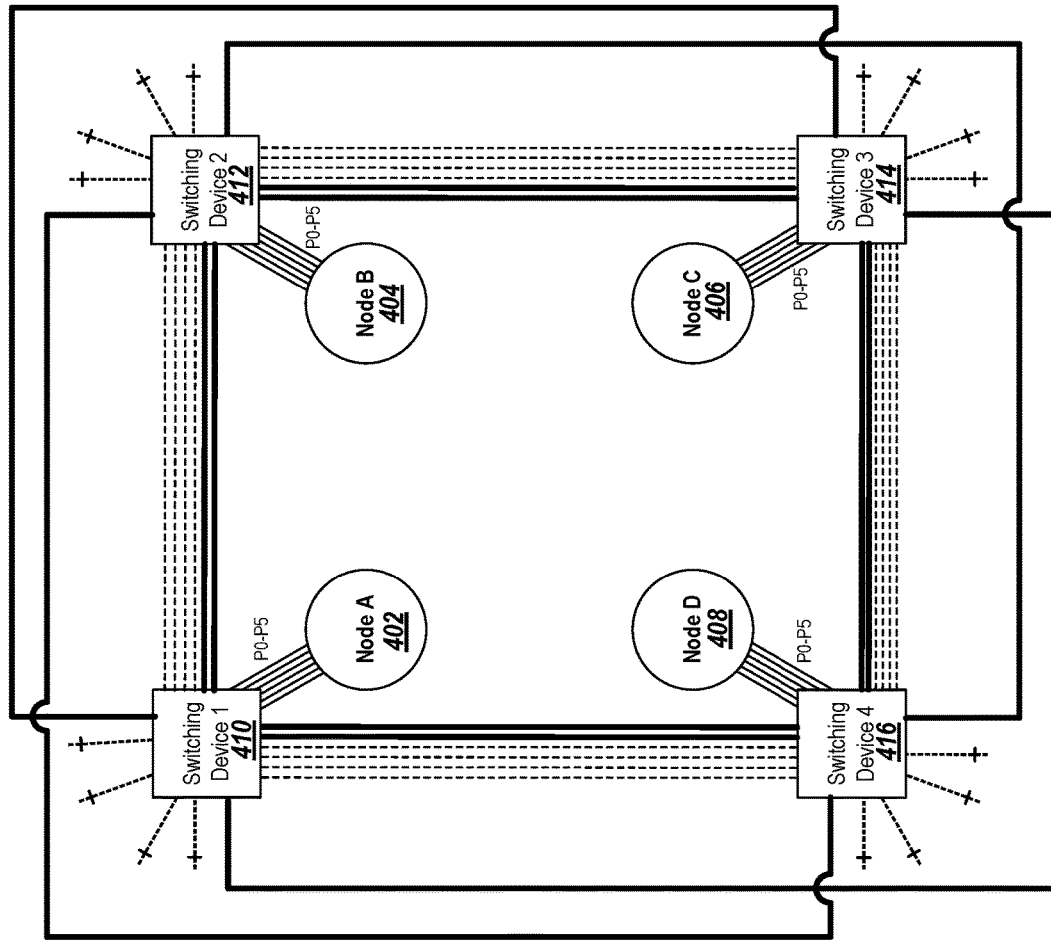
FIG. 4C

| Nodal Configuration | Network Configuration | Switching Device Control Data (Node A) | Port 0 (Node A) | Port 1 (Node A) | Port 2 (Node A) | Port 3 (Node A) | Port 4 (Node A) | Port 5 (Node A) | ... |
|---|---|---|---|---|---|---|---|---|---|
| 2X1X1 (Line) Nodes | Scalability | 1010101010 | P4 (Node B) (Dedicated) | P4 (Node A - TCU 2) | P5 (Node D - TCU 3) | P1 (Node A - TCU 4) | P0 (Node B - TCU 5) | P1 (Node D) | ... |
| 2X1X1 (Line) Nodes | Bandwidth | 0101010101 | P4 (Node B) (Dedicated) | P2 (Node B) | P2 (Node B) | P1 (Node B) | P0 (Node B) | P1 (Node B) | ... |
| 2X2X1 (Square) Nodes | Scalability | 1010010010 | P4 (Node B) (Dedicated) | P4 (Node A - TCU 2) | P5 (Node D - TCU 3) | P1 (Node A - TCU 4) | P0 (Node B - TCU 5) | P1 (Node D) (Dedicated) | ... |
| 2X2X1 (Square) Nodes | Bandwidth | 0101001001 | P4 (Node B) (Dedicated) | P2 (Node B) | P1 (Node B) | P3 (Node D) | P2 (Node D) | P1 (Node D) (Dedicated) | ... |
| 2X2X1 (Square) Nodes | Latency | 0100100101 | P4 (Node B) (Dedicated) | P2 (Node B) | P1 (Node C) | P5 (Node C) | P2 (Node D) | P1 (Node D) (Dedicated) | ... |
| 2X2X2 (Cube) Nodes | Scalability | 100... | | P4 (Node A - TCU 2) | P5 (Node D - TCU 3) | P1 (Node A - TCU 2) (Dedicated) | P0 (Node B - TCU 5) | P1 (Node D) (Dedicated) | ... |
| 2X2X2 (Cube) Nodes | Bandwidth | 010... | | P2 (Node B) | P2 (Node A - TCU 2) | P1 (Node A - TCU 2) (Dedicated) | P2 (Node D) | P1 (Node D) (Dedicated) | ... |
| 2X2X2 (Cube) Nodes | Latency | 001... | | P3 (Node D - TCU 2) | P1 (Node C) | P1 (Node A - TCU 2) (Dedicated) | P5 (Node C) | P1 (Node D) (Dedicated) | ... |
| 4X2X2 Nodes | Scalability | 100... | P4 (Node B) (Dedicated) | P4 (Node A - TCU 2) | P5 (Node D - TCU 3) | P1 (Node A - TCU 2) (Dedicated) | P0 (Node B - TCU 5) | P1 (Node D) (Dedicated) | ... |
| 4X2X2 Nodes | Scalability | 100... | | P4 (Node A - TCU 2) | P5 (Node D - TCU 3) | P1 (Node A - TCU 2) (Dedicated) | P0 (Node B - TCU 5) | P1 (Node D) (Dedicated) | ... |
| 4X4X2 Nodes | Scalability | 100... | | ... | ... | ... | ... | ... | ... |
| ... | ... | ... | | | | | | | |
| 4X4X4 Nodes | Scalability | 100... | P4 (Node B) (Dedicated) | P4 (Node A - TCU 2) | P5 (Node D - TCU 3) | P1 (Node A - TCU 2) (Dedicated) | P0 (Node B - TCU 5) | P1 (Node D) (Dedicated) | ... |
| ... | ... | ... | | | | | | | |

FIG. 5

ENHANCED RECONFIGURABLE INTERCONNECT NETWORK

CROSS-REFERENCE TO RELATED APPLICATION

This application claims the benefit of U.S. Provisional Application No. 63/093,672, filed Oct. 19, 2020, and titled "ENHANCED RECONFIGURABLE INTERCONNECT NETWORK," which is incorporated by reference in its entirety

TECHNICAL FIELD

This description generally relates to an enhanced reconfigurable interconnect network.

BACKGROUND

Machine learning often requires large amounts of computation and communication bandwidth. To provide the needed processing capability, devices such as artificial intelligence (AI) accelerators can be used. In some cases, networks of many interconnected AI accelerators can be used to provide the desired processing capability.

SUMMARY

In some implementations, a system provides a large cluster of processing nodes that are connected by a reconfigurable interconnect fabric. The reconfigurable interconnect network can include switching devices, multiplexers, or other elements to selectively enable various combinations of direct, physical-layer connections between processing nodes. The processing nodes can be artificial intelligence (AI) accelerator devices or machine learning (ML) accelerator devices, for example, application-specific integrated circuits (ASICs) such as a Tensor Processing Unit (TPU). As a result, the system can provide a large cluster of accelerators that are configurable in many different ways to achieve the performance characteristics needed for different tasks.

One of the advantages of the reconfigurable interconnect fabric is an ability to maximize utilization of the data ports provided by each accelerator device. When allocating processing nodes for a processing task, a network topology such as a 3D torus or twisted tori can provide very high scalability for a network of AI accelerators. To support a 3D torus topology, each processing node would include at least six data ports, one to connect with each of the neighboring processing nodes in the X, Y, and Z dimensions. However, as useful as the 3D torus configuration is for large sets of nodes, it does not scale well for smaller configurations, such as 2, 4, 8, 16, or 32 processing nodes. In small-scale use cases, many of the available data ports would go unused, leaving much of the available bandwidth of the processing nodes unavailable. For example, in an 8-node configuration, such as a 2×2×2 cube of processing nodes, only three data ports from each processing node would be used, leaving 50% of the available data bandwidth unused. Similarly, for four processing nodes arranged 2×2×1, only two data ports are used for each processing node, and so 67% of the available bandwidth is inaccessible.

Other network topologies that can be used by the system include, for example, 2D torus, mesh, cube, and mesh-torus combination network topologies.

To better utilize the capabilities of the processing nodes and to provide faster processing, the system can establish additional connections or links between the processing nodes. For example, rather than use a single connection or link between two accelerator devices, at least for some configurations the reconfigurable interconnect fabric can use any available data ports to establish multiple connections or links between processing nodes, which can allow much greater bandwidth for data transfer. Consider a graph of four processing nodes arranged in a square, with each processing node connected to its two neighboring processing nodes along edges of the square. To allow greater bandwidth, the reconfigurable interconnect fabric can provide physical routing connections to allow multiple concurrent connections between pairs of processing nodes along the edges of the square. For example, instead of a single connection along the edge, three connections can be provided, which will utilize all six data ports for each processing node and will provide triple the bandwidth for each pair of connected nodes.

As another example, the reconfigurable interconnect fabric can include additional physical routing paths, selectively enabled by switching devices, that are not typically present in a typical rectangular grid organization. For example, in the case of the four processing nodes arranged in a square, in addition to providing paths to connect nodes along edges of the square, the reconfigurable interconnect fabric can provide diagonal paths to reach the remaining node, resulting in a fully-connected mesh with each of the four nodes having a double connection to each of the other four nodes. The diagonal connections can reduce latency by avoiding buffering cost caused by passing data through intermediate nodes.

To allow the versatility of different connection topologies with the potential for multiple connections between nodes, the reconfigurable interconnect fabric includes more physical routing connections for each node than can be concurrently used by the node. For example, each processing node may have six data ports, but the fabric may include physical-layer routing for many more than six different connections, often 12 or more. Switching devices in the reconfigurable interconnect fabric can switch the data ports of the nodes to the appropriate set of connections for the desired interconnect configuration. In some implementations, each node has an associated switching device that sets the node's data ports for connection with the appropriate set of other nodes.

The different configurations made possible by the reconfigurable interconnect fabric allow for configurations with different properties. For example, some configurations can be tuned for scalability, others for increased bandwidth, and others for low latency. The system can select from among the different configurations based on factors such as the needs of the task, input from a user requesting the task, or the application that performs the task.

The system can store and use predetermined configuration profiles that specify different interconnection topologies. The configuration profiles may specify different numbers of nodes (e.g., 2, 4, 8, 16, etc.), different arrangements of the nodes (e.g., 2×2×1, 4×4×1, 4×2×2, etc.) and different arrangements of connections among the nodes (e.g., torus, twisted torus, multiple connections at edges, diagonal connections, etc.). In essence, the different configuration profiles can define different types of sub-networks of processing nodes within the overall cluster of processing nodes, each of which can provide different performance characteristics. As an example of just a few options, a first profile can specify a four-node topology in a scalability-optimized network configuration, a second profile can specify a four-node topology in a bandwidth-optimized network configuration, and a third profile can specify a four-node topology in a latency-optimized network configuration.

When allocating resources of the cluster, the system can select an appropriate configuration profile and use information in the configuration profile to set the specified connections among a subset of nodes. For example, the system can refer to the profile to determine how to reconfigure a nodal topology for a particular network configuration. The profile may include control information or configuration settings that can be used to adjust the configuration of switching devices in the reconfigurable interconnect fabric. The profiles may also include routing tables or other data that can be used after the reconfiguration of the fabric to specify how to use the data ports, as connected in the current topology, to transfer data among the processing nodes.

The system may be part of an artificial intelligence accelerator application-specific integrated circuit (ASIC) architecture. For example, the system may contain multiple hosts and thousands of ASIC accelerator chips. The hosts can communicate with the Top of Rack (ToR) switches, cluster network and cluster storage just like typical data centers. Each host may connect with one or more ASIC trays through a PCI-e interface. Besides the host network, the ASIC chips themselves may contain a high speed interconnect network specifically for data exchange during the machine learning model training.

In some implementations, when a user launches a machine learning training job through a request to the system, the hosts load the training data from the storage and set up the environment. After the environment is established, the ASIC accelerator chips train the machine learning models (e.g., neural networks) and communicate with each other through the Inter-Core Interconnect (ICI) links. The training process may require a duration on the order from seconds up to days, depending on the machine learning model size and the number of ASIC accelerator chips. During that period, the inter-host communication is much less than the ASIC-ASIC communications.

In some implementations, a system comprises: a cluster of processing nodes; a reconfigurable interconnect fabric to selectively connect the processing nodes, wherein the reconfigurable interconnect fabric is configured to enable multiple concurrent connections between at least some of the processing nodes; a data storage system storing multiple configuration profiles that respectively specify different configurations of the reconfigurable interconnect fabric for subsets of the processing nodes in the cluster, wherein at least some of the different configurations provide different numbers of connections between processing nodes to provide different levels of data transfer bandwidth between pairs of processing nodes; and a management system configured to: select a configuration profile from among the multiple configuration profiles; use the reconfigurable interconnect fabric to set connections among a subset of the processing nodes as specified by the selected configuration profile; and provide access to the subset of the processing nodes, with connections among the subset of processing nodes as specified by the selected configuration profile, for performing a processing task.

In some implementations, the processing nodes each have multiple data ports; and the reconfigurable interconnect fabric comprises switching devices configured to programmably set connections among the data ports of the processing nodes.

In some implementations, the selected configuration profile specifies a configuration in which each of the data ports of each of the processing nodes in the subset is connected to one of the other processing nodes in the subset.

In some implementations, the multiple configuration profiles include a plurality of configuration profiles that respectively specify different sets of connections among a subset of the processing nodes, wherein the set of connections for each of the configuration profiles in the plurality of configuration profiles utilizes each data port of each processing node in the subset.

In some implementations, the management system is configured to allocate multiple different subsets of the processing nodes in the cluster such that the different subsets are separately used to concurrently perform different processing tasks of different users.

In some implementations, the management system is configured to concurrently use configurations from different configuration profiles for different processing tasks, wherein the different configuration profiles involve at least one of (i) different numbers of processing nodes or (ii) different connection topologies among the subset of processing nodes.

In some implementations, each of the processing nodes is associated with one or more switching elements in the reconfigurable interconnect fabric that are configured to set connections of the processing node with other nodes; and the selected configuration profile comprises configuration data, for each particular processing node of the processing nodes, specifying a setting for the associated one or more switching elements of the particular processing node to achieve the configuration of the selected configuration profile.

In some implementations, the selected configuration profile comprises a routing table, for each particular processing node of the processing nodes, specifying routing information for communicating with the other processing nodes connected to the particular processing node in the configuration specified by the selected configuration profile.

In some implementations, the multiple configuration profiles include a plurality of configuration profiles that each specify a different configuration of connections among a same number of processing nodes.

In some implementations, the plurality of configuration profiles includes: a first configuration profile specifying a first configuration of connections; a second configuration profile specifying a second configuration having connections set to provide increased bandwidth than the first configuration; and a third configuration profile specifying a third configuration having connections set to provide lower latency than the first configuration. The three configurations may all use the same number of total connections or data ports of the processors, and may use the same number of processing nodes, the same topology of the processing nodes, and the same speed and type of data connections (e.g., same frequency, transfer protocol, compression, packet format, etc.), so the differences in the three configurations is only the allocation of the data ports and connections between nodes. The second configuration may provide higher latency (e.g., on average across the network and/or between certain routes or paths) compared to the first and third configurations and may increase the latency or number of hops between certain routes between nodes in order to increase bandwidth between other nodes. The second configuration may provide higher bandwidth than the third configuration as well. Similarly, the third configuration may provide lower bandwidth than the first and second configurations, at least for some routes in the network or for the network as a whole.

In some implementations, the first configuration is a torus network topology or a twisted torus network topology, the first configuration having a single connection between pairs of processing nodes connected in the first configuration; wherein the second configuration has multiple connections between at least some pairs of processing nodes connected in the second configuration; and wherein the third configuration has multiple connections between at least some pairs of processing nodes connected in the second configuration.

In some implementations, the processing nodes are organized in an n-dimensional graph, wherein each vertex in the graph represents one of the processing nodes and each edge in the graph represents a routing path that can be selectively enabled between the processing nodes, wherein n is an integer greater than zero; the reconfigurable interconnect fabric provides, for each processing node, a routing path to each neighboring processing node in the graph along axes of each of the n dimensions; and the reconfigurable interconnect fabric additionally provides, for each processing node, a routing path to each processing node that is reachable through a single step in the graph along each of two different dimensions of the n dimensions.

In some implementations, the reconfigurable interconnect fabric provides, for each processing node, multiple routing paths to each neighboring processing node in the graph along axes of each of the n dimensions.

In some implementations, the cluster of processing nodes is a network of machine learning accelerators.

In some implementations, the processing nodes are application-specific integrated circuits (ASICs).

In some implementations, the ASICs are Tensor Processing units (TPUs).

In some implementations, the reconfigurable interconnect fabric is configured to selectively route data among the processing nodes over at least one of: a copper cable medium; an optical medium; or a printed circuit board (PCB) medium. In some cases, at least some of the switches in the reconfigurable interconnect are for optical data-carrying media, such as switches for fiber optics.

In some implementations, the processing task comprises training a neural network.

In another general aspect, a method performed by one or more computers includes: storing multiple configuration profiles for a cluster of processing nodes coupled through a reconfigurable interconnect fabric, the multiple configuration profiles specifying different configurations of the reconfigurable interconnect fabric to connect subsets of the processing nodes in the cluster, wherein at least some of the different configurations provide different numbers of connections between processing nodes to provide different levels of data transfer bandwidth between pairs of processing nodes; selecting a configuration profile from among the multiple configuration profiles; using the reconfigurable interconnect fabric to set connections among a subset of the processing nodes as specified by the selected configuration profile; and providing access to the subset of the processing nodes, with connections among the subset of processing nodes as specified by the selected configuration profile, for performing a processing task.

In some implementations, the method includes determining a particular number of processing nodes to allocate for the processing task. Selecting the configuration profile comprises selecting from among a plurality of the configuration profiles that each involve the particular number of processing nodes.

In some implementations, determining the particular number of processing nodes is based on user input specifying the particular number of nodes.

In some implementations, the configuration profiles specify different configurations providing different characteristics for at least one of bandwidth, latency, and scalability.

In some implementations, selecting the configuration profile to use for the processing task is based on at least one of: a default configuration preference; a selection of a configuration by a user; analysis of operations of the processing task; or data indicating characteristics of the processing task or one or more other processing tasks.

In some implementations, the method includes allocating the subset of the processing nodes to perform the processing task separately from and concurrently with processing for other processing tasks running on other subsets of the processing nodes in the cluster.

In some implementations, the processing nodes each have multiple data ports, and the reconfigurable interconnect fabric comprises switching devices configured to programmably set connections among the data ports of the processing nodes.

In some implementations, the selected configuration profile specifies a configuration in which each of the data ports of each of the processing nodes in the subset is connected to one of the other processing nodes in the subset.

In some implementations, the multiple configuration profiles include a plurality of configuration profiles that respectively specify different sets of connections among a subset of the processing nodes, wherein the set of connections for each of the configuration profiles in the plurality of configuration profiles utilizes each data port of each processing node in the subset.

In some implementations, the method includes concurrently using configurations from different configuration profiles for different subsets of the processing nodes performing different processing tasks, wherein the different configuration profiles involve at least one of (i) different numbers of processing nodes or (ii) different connection topologies among the subset of processing nodes.

In some implementations, each of the processing nodes is associated with one or more switching elements in the reconfigurable interconnect fabric that are configured to set connections of the processing node with other nodes; and the selected configuration profile comprises configuration data, for each particular processing node of the processing nodes, specifying a setting for the associated one or more switching elements of the particular processing node to achieve the configuration of the selected configuration profile.

In some implementations, the selected configuration profile comprises a routing table, for each particular processing node of the processing nodes, specifying routing information for communicating with the other processing nodes connected to the particular processing node in the configuration specified by the selected configuration profile.

In some implementations, the method includes using the routing tables from the selected configuration profile to provide data among the processing nodes in the subset during the processing task.

In some implementations, the multiple configuration profiles include a plurality of configuration profiles that each specify a different configuration of connections among a same number of processing nodes.

In some implementations, the plurality of configuration profiles includes: a first configuration profile specifying a first configuration of connections; a second configuration profile specifying a second configuration having connections set to provide increased bandwidth than the first configuration; and a third configuration profile specifying a third configuration having connections set to provide lower latency than the first configuration.

In some implementations, the first configuration is a torus network topology or a twisted torus network topology, the first configuration having a single connection between pairs of processing nodes connected in the first configuration; wherein the second configuration has multiple connections between at least some pairs of processing nodes connected in the second configuration; and wherein the third configuration has multiple connections between at least some pairs of processing nodes connected in the second configuration.

In some implementations, the processing nodes are organized in an n-dimensional graph, wherein each vertex in the graph represents one of the processing nodes and each edge in the graph represents a routing path that can be selectively enabled between the processing nodes, wherein n is an integer greater than zero; wherein the reconfigurable interconnect fabric provides, for each processing node, a routing path to each neighboring processing node in the graph along axes of each of the n dimensions; and wherein the reconfigurable interconnect fabric additionally provides, for each processing node, a routing path to each processing node that is reachable through a single step in the graph along each of two different dimensions of the n dimensions.

In some implementations, the reconfigurable interconnect fabric provides, for each processing node, multiple routing paths to each neighboring processing node in the graph along axes of each of the n dimensions.

In some implementations, the cluster of processing nodes is a network of machine learning accelerators.

In some implementations, the processing nodes are application-specific integrated circuits (ASICs). In some cases, each processing node may be a single ASIC. In other implementations, a single processing node may comprise multiple ASICs and related components that operate together. In other implementations, a single ASIC may include multiple different processing nodes, e.g., processing cores that operate as separate processing nodes, for which the communication links can still be reconfigured (either by functionality on the ASIC or off the ASIC).

In some implementations, the ASICs are Tensor Processing units (TPUs).

In some implementations, the reconfigurable interconnect fabric is configured to selectively route data among the processing nodes over at least one of: a copper cable medium; an optical medium; or a printed circuit board (PCB) medium.

In some implementations, the processing task comprises training a neural network or other machine learning model.

Particular embodiments of the subject matter described in this specification can be implemented so as to realize one or more of the following advantages. For example, the techniques disclosed in this document can be used to improve efficiency by reducing the number of physical links or data ports of processors that are not being utilized. In particular, by reconfiguring the network topology to use physical links that were not previously being utilized, e.g., in some cases bandwidth can be increased (e.g., by two times, three times, or six times the typical single-port bandwidth) and in some cases latency can be decreased (e.g., through the utilization of diagonal links in certain configurations). This benefit is particularly evident in small scale use cases, where large percentages of the physical data ports and their associated bandwidth would otherwise not be utilized with only single-connection links between nodes.

Other embodiments of these aspects and other aspects disclosed herein include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Details of one or more implementations are set forth in the accompanying drawings and the description below. Other features, objects, and advantages will be apparent from the description and drawings, and from the claims.

DESCRIPTION OF DRAWINGS

FIG. 4C is a diagram that illustrates an example circuit schematic for a four-node topology in a latency-optimized network configuration.

FIG. 5 is a diagram that illustrates various network configuration profiles for different nodal topologies.

Like reference symbols in the various drawings indicate like elements.

DETAILED DESCRIPTION

Figure 1:
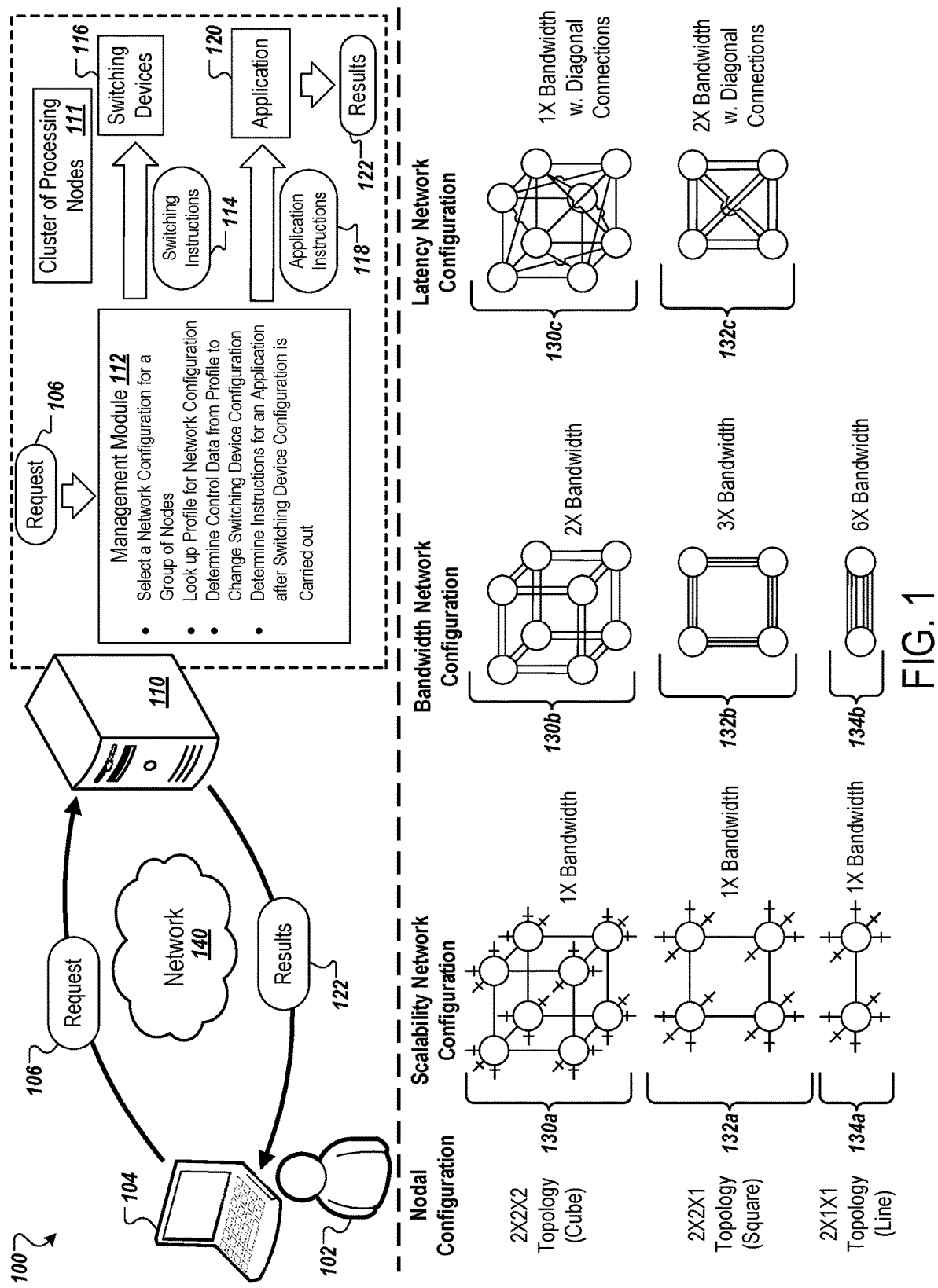
FIG. 1 is a diagram depicting an example system for providing a reconfigurable interconnect network.

FIG. 1 is a diagram depicting an example system 100 for providing reconfigurable network topology and IO parallelism. The system 100 includes a server system 110 that provides access to a cluster of processing nodes 111. The system also includes a client device 104 that a user can use to request processing tasks to be performed using the cluster of processing nodes 111. The server system 110 and the client device 104 can communicate over a network 140. The client device 104 may be used by one or more users, such as a user 102.

The figure shows various different node topologies 130a-130c, 132a-132c, 134a-134b that represent different configurations of the interconnections between processing nodes. The server system 110 includes a management module 112 that use a reconfigurable interconnect fabric, including switching devices 116, to implement any of these node topologies within the cluster of processing nodes 111, often using a small fraction of the total set of processing nodes in the cluster of processing nodes 111 and leaving the remaining processing nodes to be allocated in different subsets which may have different topologies for different jobs.

More generally, the management module 112 performs resource allocation to allocate different subsets of the processing nodes in the cluster of processing nodes 111 for different tasks (e.g., for the tasks of different users, applications, accounts, sessions, etc.). From a large cluster 111 of dozens, hundreds, thousands, or tens of thousands of processing nodes, the management module 112 allocates different subsets of processing nodes to operate separately, e.g., independent of the rest of the cluster or processing nodes 111 and with the subsets isolated from each other. For example, the system can dynamically assign an isolated subgraph or sub-network of processing nodes within the overall cluster. This allows the cluster of processing nodes 111 to be shared concurrently for many different users or tasks, enabling the subsets or subgroups of nodes to run their respective tasks independently and isolated from each other. The arrangement facilitates use as a cloud computing platform, such as for software as a service (Saas), platform as a service (PaaS), machine learning as a service (MLasS), and other use cases.

In general, the disclosure relates to reconfiguring channels of communication or ports in a high-speed communication network, e.g., a network of machine learning accelerators that includes multiple application specific integrated circuits (ASICs). Deep learning training often necessitates distributed, parallel processing. The distribution can either partition the large amounts of training data into different replications or replicas (e.g. data parallelism), or partition a very large model into smaller modules (e.g., model parallelism). The partitioned training data and model parameters are put onto different processing units to compute concurrently.

Distributed training happens in a synchronous, iterative, and incremental loop. Under data parallelism, each processing unit ingests a mini-batch of data at each step, computes the local gradients, and then exchanges all local gradients throughout the network of compute units in an all-reduce manner to compute a final, globally consistent gradient, with which model weights are updated at the end of a step.

Under model parallelism, each processing unit takes model activation input from its local training data, or from the output of another processing unit that operates on hidden layers before itself. The processing unit then computes the activation output, which can either be a final model output, or serve as the activation input of another processing unit. The gradient is computed on the processing unit that includes the final layer, and gets sent back to the previous layers to update the partitioned submodels. This process can be pipelined to operate on successive mini-batches. Under this approach, intermediate activation output is sent around the network, as well as the gradients at the model partitioning boundaries.

In practice, data and model parallelism can be combined to achieve the highest performance. For example models with hundreds of billions of weight parameters, a huge amount of compute resources and communications are needed to converge the model to the level of accuracy required.

To speed up the training process, ASICs such as the custom-built accelerator chip the Tensor Processing Unit (TPU) are designed to serve as processing nodes in order to speed up deep learning computation tasks. In some implementations, other accelerator chip types are used as processing nodes (e.g., FPGAs, GPGPUs, or CPUs). Meanwhile, a co-designed inter-accelerator high-speed communication network is also built to speed up the inter-processing unit communication. Altogether, the training system can provide exaFLOP-level compute performance, equivalent to a state-of-the-art supercomputer.

The TPU accelerator's custom-built network is designed for simplicity in order to reduce the network processing overhead. With the fundamental features of an interconnected network complete, such as addressing, error detection and correction, routing and flow control, the bulk of network processing is carried over on the accelerator chip hardware to speed up processing.

The solutions disclosed herein apply to the synchronous data-parallel and model-parallel training pattern discussed above, and also apply to asynchronous, distributed training in an accelerator network in general.

The components of the system 100 can be interconnected by any form or medium of digital data communication (e.g., a communication network). For example, the client device 104 may communicate with the server system 110. The cluster of processing nodes 111 may be able to identify different groups of nodes, and reconfigure the network configuration for those nodes as needed for different situations. Notably, different network configurations may be ideal for different situations. For example, scalability-optimized network configurations may preferred for larger use cases that require larger nodal configurations. In contrast, bandwidth-optimized configurations may be preferred for small use cases and/or when performance is prioritized (e.g., increased bandwidth is needed). Similarly, latency-optimized configurations may be preferred for small use cases and/or when performance is prioritized (e.g., reduced latency is needed).

The nodes may have a particular nodal configuration (e.g., topology). As an example, the nodes may arranged in a 2×2×2 topology (e.g., cube topology), a 2×2×1 topology (e.g., square topology), or a 2×1×1 topology (e.g., line topology). However, various other nodal configurations are possible. For example, the nodes may be arranged in a 4×2×2 topology, a 4×4×2 topology, or a 4×4×4 topology. Each of the nodal configurations may have different possible network configurations, e.g., based on the preferred type of optimization.

The management module 112 may select a particular network configuration for the nodes and reconfigure the network configuration of the nodes to match the selected network configuration. The server system 110 may select the particular network configuration for the nodes based on one or more factors. For example, whether a scalability-optimized, a bandwidth-optimized, or a latency-optimized network configuration is selected by the server system 110 for the nodes may depend on the specific task or job that the nodes will be used to perform, the type of task or job that the nodes will be used to perform, the user requesting a task or job, a group of users that a user requesting a task or job belongs to, an application that will be used to perform a task or job with the nodes, or a type of application that will be used to perform a task or job with the nodes. For example, a profile for the user 102 (e.g., stored on the client device 104) may indicate that the user 102 prioritizes data transfer speeds and throughput for their requested tasks. The server system 110 may use this preference to determine that a bandwidth-optimized network configuration should be used for nodes assigned to handle the user 102's task.

Although examples discussed below may describe selecting a network configuration based on a particular task/job or a particular type of task/job, one or more other factors may be used in addition to or in place of task/job factor(s) for selecting a particular network configuration for a group of nodes.

Each of the nodes may have multiple data ports (e.g., ICI ports). The nodes may be part of a chipset (e.g., a set of multiple chips), such as a set of artificial intelligence accelerator application-specific integrated circuit (ASIC). One example of an ASIC would be a tensor processing unit (TPU). Each node may represent a chip on one or more chipsets. For example, each chipset may include four chips that each serve as separate nodes. Each chipset may further include one or more switching devices for each of the nodes, such as one or more multiplexers (e.g., ICI multiplexers) that are used to reconfigure the network configuration. The cluster 111 can be formed of many different chipsets, e.g., trays in which each tray includes (i) four ASIC processing node chips, (ii) associated switching devices for adjusting connections among the nodes in the tray, and (iii) switching devices to reconfigurably connect the tray to other trays (e.g., to connect nodes in the tray with nodes of another tray. The cluster 111 can also include additional infrastructure to connect trays together and to route connections among nodes of different trays.

The client device 104 may be, for example, a mobile computing device such as a smart phone, a mobile phone, a table computer, a smart watch, a laptop computer, a PDA, etc. The client device 104 may be a desktop computer, a server, or part of a server. The client device 104 may include a storage device. The client device 104 may include memory, such as RAM (e.g., DRAM, SRAM, etc.).

The network 140 may be a local area network ("LAN"), a wide area network ("WAN"), a peer-to-peer network (having ad-hoc or static members), a grid computing infrastructure, or the Internet.

As illustrated in FIG. 1, a request 106 is sent from the client device 104 to the server system 110 over the network 140. The request 106 may correspond to or include an indication of a particular task to be performed by the server system 110. For example, the task may include the retrieval of particular information. The request 106 may initiated by the user 102. For example, the request 106 may be generated and send in response to the user 102 indicating that a particular task be performed. The request 106 may include additional information, such as an indication of the client device 104 making the request, and/or the user 102 initiating the request 106.

In response to receiving the request 106, the server system 110 provides the request to a management module 112. The management module 112 may first identify a group of nodes to perform the task corresponding to the request 106. For example, the management module 112 may assign a group eight nodes in a cube topology (e.g., assign two TPU chipsets to perform the task), a group of four nodes in a square topology (e.g., assign a single TPU chipset to perform the task), or a group of two nodes in a line topology (e.g., assign half of the chips of a single TPU chipset to perform the task) to perform the task corresponding to the request 106.

The management module 112 may proceed to use the request 106 to select a network configuration, e.g., to perform a task corresponding to the request 106. For example, the management module 112 may select a bandwidth-optimized configuration for the group of nodes if the task requires the transfer of a large amount of data.

Once a network configuration has been selected by the management module 112, the management module 112 may proceed to lookup a profile for the network configuration and the nodal topology of the group of nodes. For example, as will be discussed in more detail below with respect to FIG. 5, the management module 112 may refer to a look-up table to find entries corresponding to a bandwidth-optimized network configuration for a 2×2×1 (square) nodal topology. The profile may indicate how node ports are to be connected between other nodes (e.g., other nodes in the group of nodes (e.g., of the same chipset), and/or other nodes outside of the group pf nodes (e.g., as part of other chipsets)). The profile may further indicate switching instructions 114 to accomplish the outlined port connections. These switching instructions may be in the form of multiplexer control inputs (e.g., that each receive a bit of 1 or 0). The switching instructions 114 may include a set of instructions for each node in the group of nodes (e.g., for each switching device of each node in the group of nodes). For example, if the group of nodes has a square topology, the switching instructions 114 may include four sets of instructions, one for each multiplexer corresponding to each of the nodes.

In some cases, each node is associated with multiple switching devices. For example, each node may correspond to two or more multiplexers (e.g., ICI multiplexers) that are used to accomplish the reconfiguration of the network configuration.

The management module 112 may provide the switching instructions 114 to switching devices 116. The switching devices 116 may include, for example, at least one switching device corresponding to each of the nodes in the group of nodes. The switching devices 116 may be multiplexers. Specifically, the management module 112 may provide the switching instructions 114 as control inputs to the controls of each of the multiplexers corresponding to the group of nodes. In response to receiving the switching instructions 114, the switching devices 116 update their configurations in accordance with the switching instructions 114. In some cases, a configuration of one or more of the switching devices 116 may already be in a configuration that is in accordance with the switching instructions 114. Accordingly, in this case, the one or more switching devices would not have their configurations updated.

After the configurations of the switching devices 116 are updated, the management module 112 may determine application instructions 118 to run an application 120. The application instructions 118 may be extracted from the request 106 or generated from the request 106. The application 120 may be run to perform the task corresponding to the request 106. As a result of running the application 120, results 122 are generated. The results 122 may be sent by the server system 110 to the client device 104 over the network 140.

As further illustrated in FIG. 1, three example nodal configurations (e.g., topologies) and corresponding network configurations are depicted. As shown, a cube topology 130a in a scalability-optimized network configuration utilizes a single physical lane between the nodes. The nodes of the cube topology 130a each utilize three, single-lane connections to external nodes (e.g., nodes of other TPU chipsets). As a result of utilizing only single physical lanes, the cube topology 130a has a 50% underutilized lane (e.g., link) ratio which results in wasted bandwidth.

In contrast, a cube topology 130b in a bandwidth-optimized network configuration utilizes two physical lanes between the nodes in the cube topology 130b. The nodes of the cube topology 130b no longer utilize any lanes to connect to external nodes (e.g., nodes of other TPU chipsets). In this configuration, the cube topology 130b can achieve 2× bandwidth (e.g., when compared to the cube topology 130a).

A cube topology 130c in a latency-optimized network configuration utilizes a single physical lane between each of the nodes in the cube topology 130c, including diagonal connections. These additional diagonal connections can improve latency by, for example, avoiding the buffering cost caused by intermediate nodes (e.g., TPU chips). The nodes of the cube topology 130c no longer utilize any lanes to connect to external nodes (e.g., nodes of other TPU chipsets). In this configuration, the cube topology 130b can achieve 1× bandwidth (e.g., when compared to the cube topology 130a) but is able to achieve reduced latency.

A square topology 132a in a scalability-optimized network configuration utilizes a single physical lane between the nodes. The nodes of the square topology 132a each utilize four, single-lane connections to external nodes (e.g., nodes of other TPU chipsets). As a result of utilizing only single physical lanes between the nodes, the square topology 132a has a 67% underutilized lane (e.g., link) ratio which results in significant wasted bandwidth.

In contrast, a square topology 132b in a bandwidth-optimized network configuration utilizes three physical lanes between the nodes in the square topology 132b. The nodes of the square topology 132b no longer utilize any lanes to connect to external nodes (e.g., nodes of other TPU chipsets). In this configuration, the square topology 132b can achieve 3× bandwidth (e.g., when compared to the square topology 132a).

A square topology 132c in a latency-optimized network configuration utilizes two physical lanes between each of the nodes in the square topology 132c, including diagonal connections. These additional diagonal connections can improve latency by, for example, avoiding the buffering cost caused by intermediate nodes (e.g., TPU chips). The nodes of the square topology 132c no longer utilize any lanes to connect to external nodes (e.g., nodes of other TPU chipsets). In this configuration, the square topology 132b can achieve 2× bandwidth (e.g., when compared to the cube topology 130a) and is also able to achieve reduced latency.

A line topology 134a in a scalability-optimized network configuration utilizes a single physical lane between the nodes. The nodes of the line topology 134a each utilize five, single-lane connections to external nodes (e.g., nodes of other TPU chipsets). As a result of utilizing only single physical lanes between the nodes, the line topology 134a has an 83% underutilized lane (e.g., link) ratio which results in wasted bandwidth.

In contrast, a line topology 134b in a bandwidth-optimized network configuration utilizes six physical lanes between the two nodes in the line topology 134b. The nodes of the line topology 134b no longer utilize any lanes to connect to external nodes (e.g., nodes of other TPU chipsets). In this configuration, the line topology 134b can achieve 6× bandwidth (e.g., when compared to the line topology 134a).

Although various examples are described above with respect to TPU chips and chipsets, the described features can be applied to other machine learning accelerators. For example, the described features can be used with graphics processor units (GPU), field-programmable gate arrays (FPGA), intelligence processing units (IPU), and various AI processor clusters.

Figure 2A:
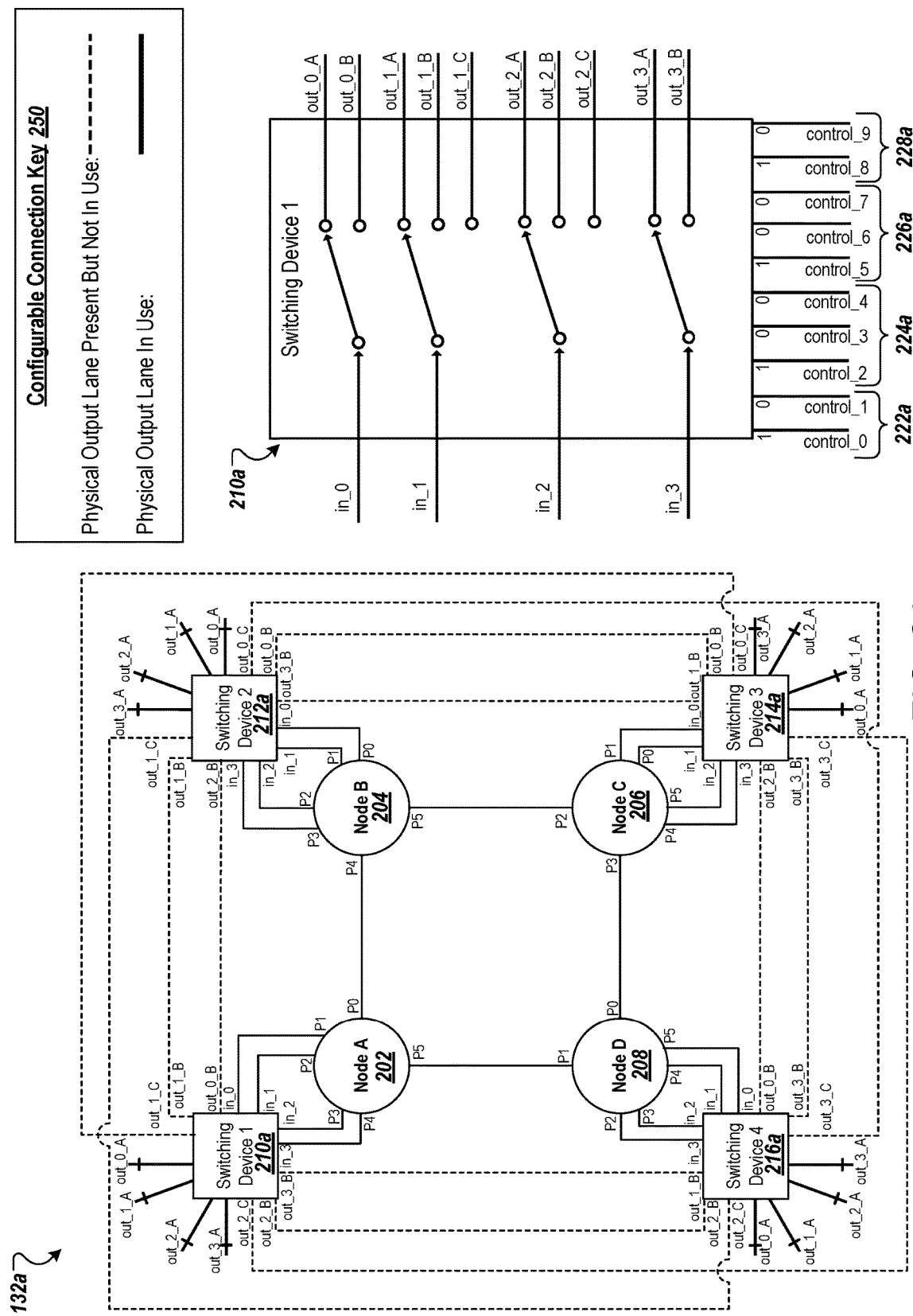
FIG. 2A is a diagram that illustrates an example circuit schematic for a four-node topology in a scalability-optimized network configuration.

FIG. 2A is a diagram that illustrates an example circuit schematic for a four-node topology in a scalability-optimized network configuration. As shown, the example schematic depicts the various input, output, and port connections for the square topology 132a in the scalability-optimized network configuration.

The square topology 132a includes a first node 202 (Node A), a second node 204 (Node B), a third node 206 (Node C), and a fourth node 208 (Node D). Each of the nodes 202, 204, 206, and 208 may be chips of an ASIC chipset, such as a TPU chipset. Each of the nodes 202, 204, 206, and 208 include six ports (P0, P1, P2, P3, P4, and P5). However, in other implementations, the nodes may contain more or less ports. These ports may be ICI ports. These ports may be used to connect to ports of other nodes, either directly or through one or more switching devices.

Each of the nodes 202, 204, 206, and 208 may be associated with a corresponding switching device, such as a multiplexer that is used to reconfigure the network configuration for the square topology 132a. For example, the node 202 is associated with a first switching device 210a, the node 204 is associated with a second switching device 212a, the node 206 is associated with a third switching device 214a, and the node 208 is associated with a fourth switching device 216a. The switching devices 210a, 212a, 214a, and 216a may each be or include a multiplexer.

In some cases, a single chipset controls all switching logic. For example, a single ASIC chip may serve each of the nodes 202, 204, 206, and 208 (e.g., which may each represent a TPU chip). The single ASIC chip can include, or otherwise be used to perform the functions of, the switching devices 210a, 212a, 214a, and 216a.

A configurable connection key 250 provides an indication of the physical routes that are being utilized. For example, physical routes that exist but are not being utilized are depicted with a thinner dashed line. In contrast, physical routes that exist and are being utilized are depicted with thicker solid line. As an example, a physical lane exists between out_1_C of the switching device 210a and out_0_C of the switching device 214a. However, the physical lane is not utilized and, therefore, is shown with a thinner dashed line. Note, dedicated connections exist between the nodes. These connections can be utilized for input and/or output functions and are depicted with a thinner solid line.

In more detail, the switching device 210a is depicted as receiving four inputs (in_0, in_1, in_2, and in_3) from the node 202, having ten controls (control_0, control_1, control_2, control_3, control_4, control_5, control_6, control_7, control_8, and control_9), and capable of producing four outputs from ten different output options (out_0_A, out_0_B, out_1_A, out_1_B, out_1_C, out_2_A, out_2_B, out_2_C, out_3_A, and out_3_B). A first group of controls 222a controls the first output (e.g., is used to select between out_0_A and out_0_B), a second group of controls 224a controls the second output (e.g., is used to select between out_1_A, out_1_B, and out_1_C), a third group of controls 226a controls the third output (e.g., is used to select between out_2_A, out_2_B, and out_2_C), and a fourth group of controls 228a controls the fourth output (e.g., is used to select between out_3_A and out_3_B). In the scalability-optimized network configuration, control_0 is set to 1 and control_1 is set to 0 to provide that in_0 goes to out_o_A; control_2 is set to 1, and control_3 and control_4 are set to 0 to provide that in_1 goes to out_1_A; control_5 is set to 1, and control_6 and control_7 are set to 0 to provide that in_2 goes to out_2_A; and control_8 is set to 1 and control_9 is set to 0 to provide that in_3 goes to out_3_A. That is, control group 222*a* is set to 10, control group 224*a* is set to 100, control group 226*a* is set to 100, and control group 228*a* is set to 10.

The controls to the switching devices of the square topology 132*a* may be provided by the management module 112 shown in FIG. 1 (e.g., as the switching instructions 114).

Although depicted as having four inputs, four outputs, ten potential outputs, and ten controls, the switching device 210*a* (and other switching devices) may be configured to receive additional inputs, produce additional and/or different outputs, and/or have additional controls. That is, the switching device 210*a* as depicted may be a simplified version of a switching device (e.g., multiplexer) that is used in practice.

Figure 2B:
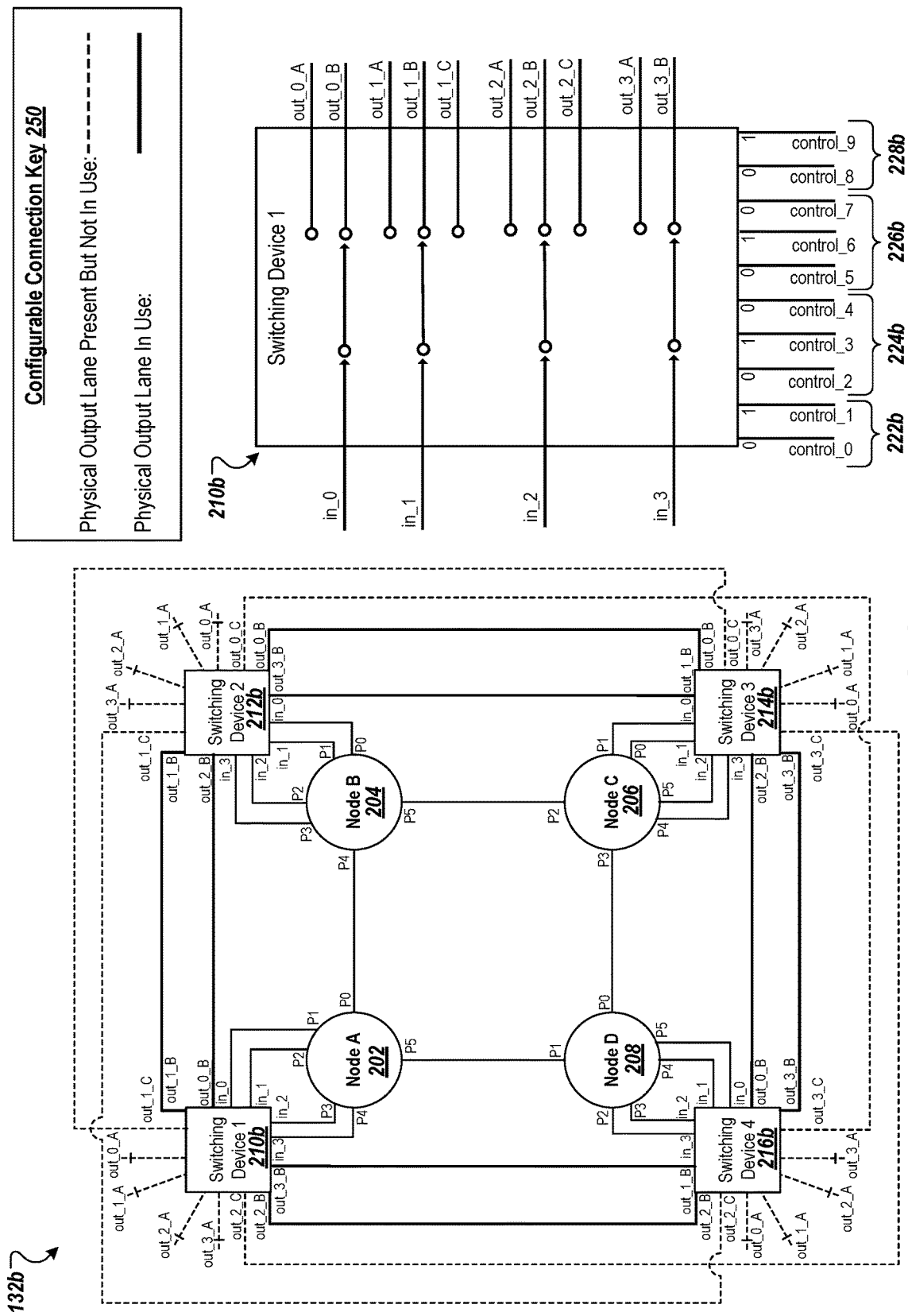
FIG. 2B is a diagram that illustrates an example circuit schematic or four-node topology in a bandwidth-optimized network configuration.

FIG. 2B is a diagram that illustrates an example circuit schematic or four-node topology in a bandwidth-optimized network configuration. As shown, the example schematic depicts the various input, output, and port connections for the square topology 132*b* in the bandwidth-optimized network configuration.

In comparison to the square topology 132*a*, the configuration of each of the switching devices 210*b*, 212*b*, 214*b*, and 216*b* of the square topology 132*b* have been modified. Specifically, as shown, the switching device 210*b*, in the bandwidth-optimized network configuration has the following control configuration: control_0 is set to 0 and control_1 is set to 1 to provide that in_0 goes to out_0_B; control_2 is set to 0, control_3 is set to 1, and control_4 is set to 0 to provide that in_1 goes to out_1_B; control_5 is set to 0, control_6 is set to 1, and control_7 is set to 0 to provide that in_2 goes to out_2_B; and control_8 is set to 0 and control_9 is set to 1 to provide that in_3 goes to out_3_B. That is, control group 222*b* is set to 01, control group 224*b* is set to 010, control group 226*b* is set to 010, and control group 228*b* is set to 01.

In this network configuration, the square topology 132*b* can achieve 3× bandwidth when compared to the square topology 132*a*. Notably, three physical lanes can be utilized between each node. For example, in this bandwidth-optimized network configuration, three connections can be made (e.g., three lanes can be utilized) between the node 202 and the node 204. These three connections may include a first dedicated direct connection between P0 of the node 202 and P4 of the node 204, a second indirect connection between P1 of the node 202 and P2 of the node 204 (through the switching device 210*b* and the switching device 212*b*), and a third indirect connection between P2 of the node 202 and P1 of the node 204 (through the switching device 210*b* and the switching device 212*b*).

The controls to the switching devices of the square topology 132*b* may be provided by the management module 112 shown in FIG. 1 (e.g., as the switching instructions 114).

Figure 2C:
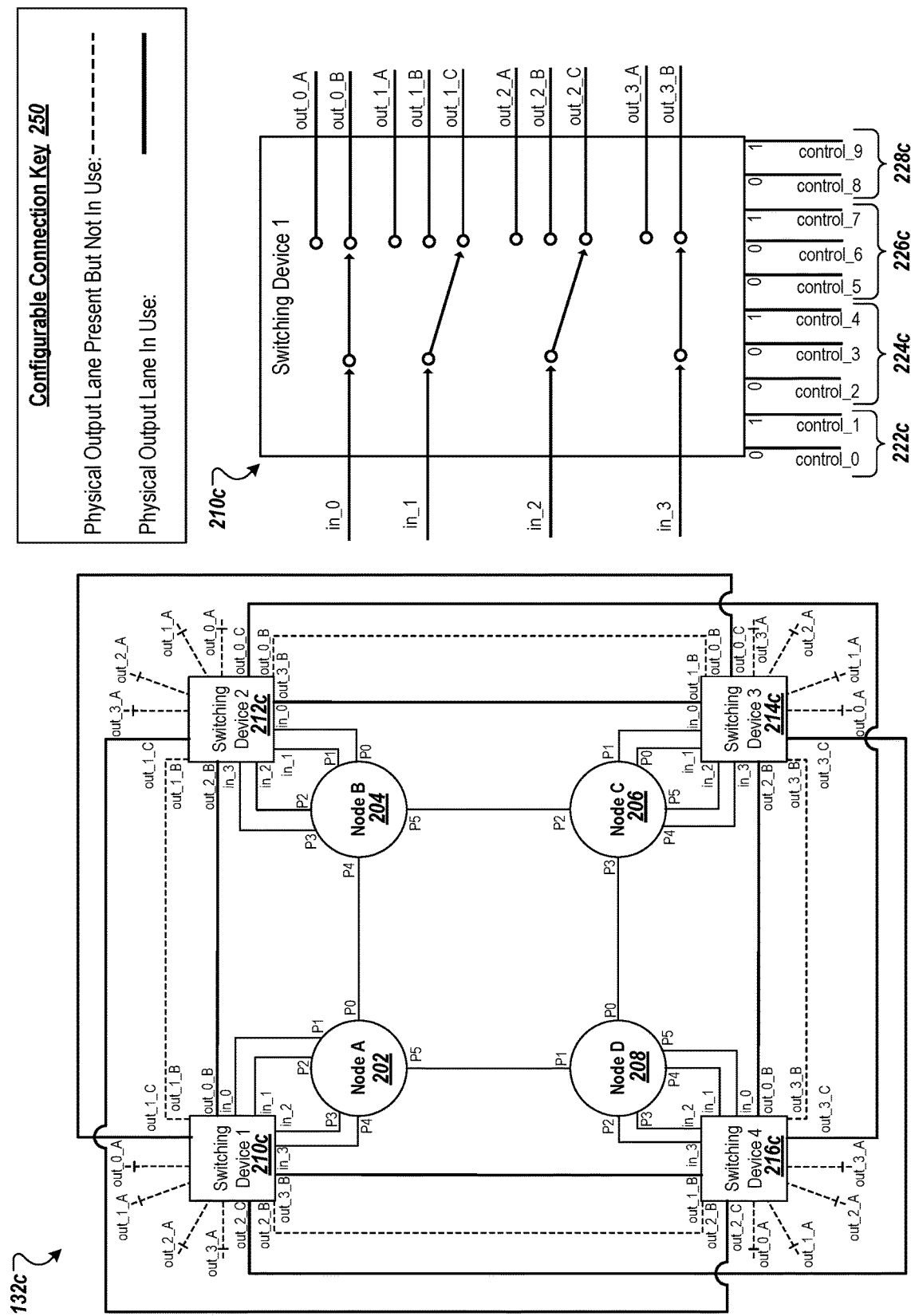
FIG. 2C is a diagram that illustrates an example circuit schematic for a four-node topology in a latency-optimized network configuration.

FIG. 2C is a diagram that illustrates an example circuit schematic for a four-node topology in a latency-optimized network configuration. As shown, the example schematic depicts the various input, output, and port connections for the square topology 132*c* in the latency-optimized network configuration.

In comparison to the square topology 132*a*, the configuration of each of the switching devices 210*c*, 212*c*, 214*c*, and 216*c* of the square topology 132*c* have been modified. Specifically, as shown, the switching device 210*c*, in the latency-optimized network configuration has the following control configuration: control_0 is set to 0 and control_1 is set to 1 to provide that in_0 goes to out_0_B; control_2 is set to 0, control_3 is set to 0, and control_4 is set to 1 to provide that in_1 goes to out_1_C (to utilize a diagonal connection); control_5 is set to 0, control_6 is set to 0, and control_7 is set to 1 to provide that in_2 goes to out_2_C (to utilize a diagonal connection); and control_8 is set to 0 and control_9 is set to 1 to provide that in_3 goes to out_3_B. That is, the control group 222*c* is set to 01, the control group 224*c* is set to 001, the control group 226*c* is set to 001, and the control group 228*c* is set to 01.

In this network configuration, the square topology 132*c* can achieve 2× bandwidth when compared to the square topology 132*a*, and a lower latency (e.g., as a result of avoiding buffering cost caused by intermediate nodes). For example, instead of having to go through node 204 in order to input/output data to the node 206 and experiencing buffering cost as a result, the node 202 in the square topology 132*c* can utilize a diagonal connection to reach node 206. Specifically, P2 of the node 202 can be connected to P1 of the node 206 through an indirect diagonal connection (e.g., formed between out_1_C of the switching device 210*c* and out_0_C of the switching device 214*c*).

The controls to the switching devices of the square topology 132*c* may be provided by the management module 112 shown in FIG. 1 (e.g., as the switching instructions 114).

Figure 3A:
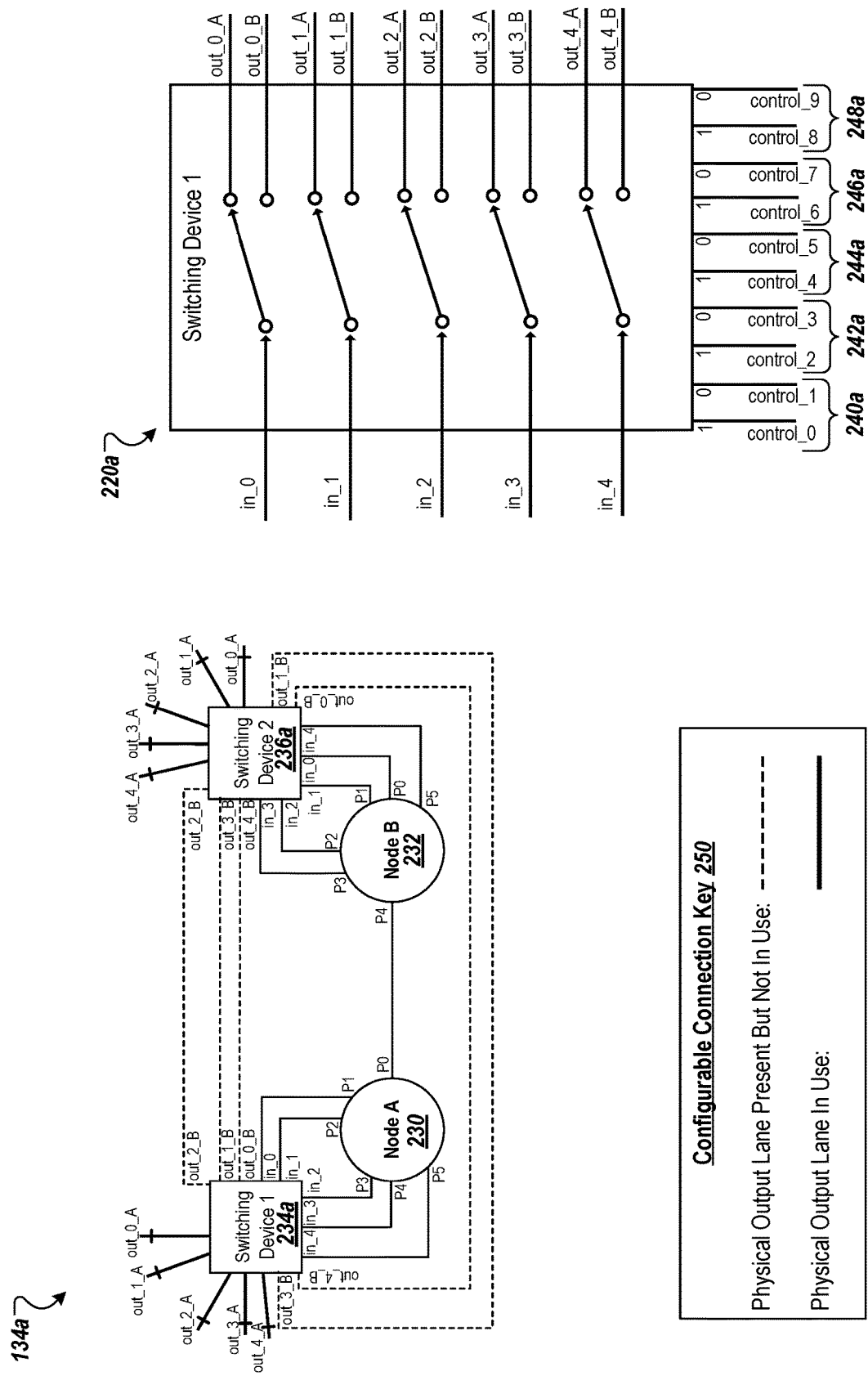
FIG. 3A is a diagram that illustrates an example circuit schematic for a two-node topology in a scalability-optimized network configuration.

FIG. 3A is a diagram that illustrates an example circuit schematic for a two-node topology in a scalability-optimized network configuration. As shown, the example schematic depicts the various input, output, and port connections for the line topology 134*a* in the scalability-optimized network configuration.

The line topology 134*a* includes a first node 230 (Node A) and a second node 232 (Node B). Each of the nodes 230 and 232 may be chips of an ASIC chipset, such as a TPU chipset. Each of the nodes 230 and 232 include six ports (P0, P1, P2, P3, P4, and P5). However, in other implementations, the nodes may contain more or less ports. These ports may be ICI ports. These ports may be used to connect to ports of other nodes, either directly or through one or more switching devices.

Each of the nodes 230 and 232 may be associated with a corresponding switching device, such as a multiplexer that is used to reconfigure the network configuration for the line topology 134*a*. For example, the node 230 is associated with a first switching device 234*a* and the node 232 is associated with a second switching device 236*a*. The switching devices 234*a* and 236*a* may each be or include a multiplexer.

The configurable connection key 250 provides an indication of the physical routes that are being utilized. For example, physical routes that exist but are not being utilized are depicted with a thinner dashed line. In contrast, physical routes that exist and are being utilized are depicted with thicker solid line. As an example, a physical lane exists between out_1_B of the switching device 234*a* and out_3_B of the switching device 224*a*. However, the physical lane is not utilized and, therefore, is shown with a thinner dashed line. Note, dedicated connections exist between the nodes. These connections can be utilized for input and/or output functions and are depicted with a thinner solid line (e.g., the dedicated physical lane between P0 of the node 230 and P4 of the node 232).

In more detail, the switching device 234*a* is depicted as receiving five inputs (in_0, in_1, in_2, in_3, and in_4) from the node 230, having ten controls (control_0, control_1, control_2, control_3, control_4, control_5, control_6, control_7, control_8, and control_9), and capable of producing five outputs from ten different output options (out_0_A, out_0_B, out_1_A, out_1_B, out_2_A, out_2_B, out_3_A, out_3_B, out_4_A, and out_4_B). A first group of controls 240*a* controls the first output (e.g., is used to select between out_0_A and out_0_B), a second group of controls 242*a* controls the second output (e.g., is used to select between out_1_A and out_1_B), a third group of controls 244a controls the third output (e.g., is used to select between out_2_A and out 2_B), a fourth group of controls 246a controls the fourth output (e.g., is used to select between out_3_A and out_3_B), and a fifth group of controls 248a controls the fifth output (e.g., is used to select between out_4_A and out_4_B). In the scalability-optimized network configuration, control_0 is set to 1 and control_1 is set to 0 to provide that in_0 goes to out_0_A; control_2 is set to 1 and control_3 is set to 0 to provide that in_1 goes to out_1_A; control_4 is set to 1 and control_5 is set to 0 to provide that in_2 goes to out_2_A; control_6 is set to 1 and control_7 is set to 0 to provide that in_3 goes to out_3_A; and control_8 is set to 1 and control_9 is set to 0 to provide that in_4 goes to out_4_A. That is, the control group 240a is set to 10, the control group 242a is set to 10, the control group 244a is set to 10, the control group 246a is set to 10, and the control group 248a is set to 10.

The controls to the switching devices of the line topology 134a may be provided by the management module 112 shown in FIG. 1 (e.g., as the switching instructions 114).

Although depicted as having five inputs, five outputs, ten potential outputs, and 10 controls, the switching device 234a (and other switching devices) may be configured to receive additional outputs, produce additional outputs, have additional potential outputs, and/or have additional controls. That is, the switching device 234a as depicted may be a simplified version of a switching device (e.g., multiplexer) that is used in practice.

Figure 3B:
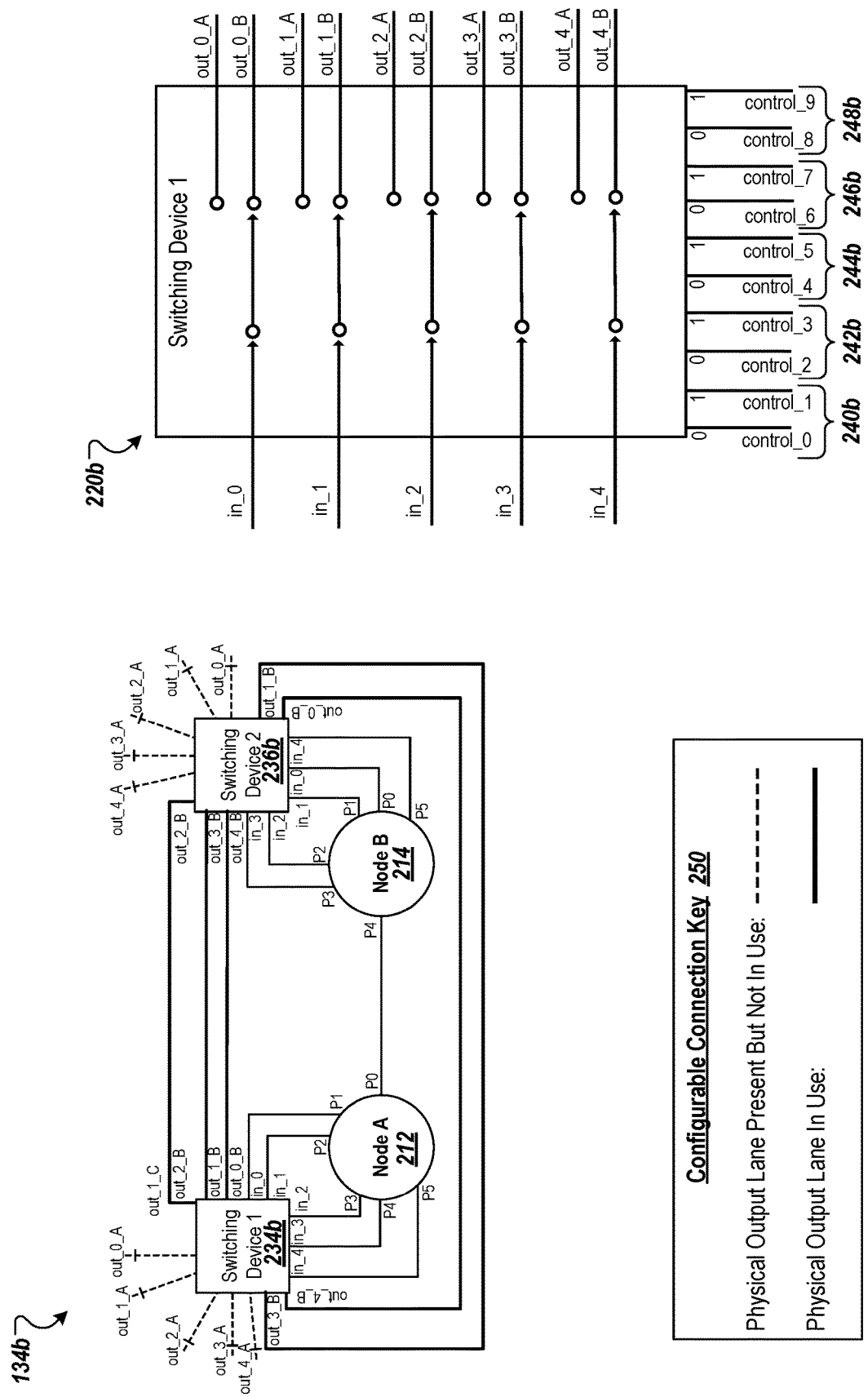
FIG. 3B is a diagram that illustrates an example circuit schematic for a two-node topology in a bandwidth-optimized network configuration.

FIG. 3B is a diagram that illustrates an example circuit schematic for a two-node topology in a bandwidth-optimized network configuration. As shown, the example schematic depicts the various input, output, and port connections for the line topology 134b in the bandwidth-optimized network configuration.

In comparison to the line topology 134a, the configuration of each of the switching devices 234b and 236b of the line topology 134b have been modified. Specifically, as shown, the switching device 236b, in the bandwidth-optimized network configuration has the following control configuration: control_0 is set to 0 and control_1 is set to 1 to provide that in_0 goes to out_0_B; control_2 is set to 0 and control_3 is set to 1 to provide that in_1 goes to out_1_B; control_4 is set to 0 and control_5 is set to 1 to provide that in_2 goes to out_2_B; control_6 is set to 0 and control_7 is set to 1 to provide that in_3 goes to out_3_B; and control_8 is set to 0 and control_9 is set to 1 to provide that in_4 goes to out_4_B. That is, control group 240b is set to 01, control group 242b is set to 01, control group 244b is set to 01, control group 246b is set to 01, and control group 248b is set to 01.

In this network configuration, the line topology 134b can achieve 6× bandwidth when compared to the line topology 134a. Notably, six physical lanes can be utilized between each node. For example, in this bandwidth-optimized network configuration, six connections can be made (e.g., six lanes can be utilized) between the node 230 and the node 232. These six connections may include a first dedicated direct connection between P0 of the node 230 and P4 of the node 232, a second indirect connection between P1 of the node 230 and P3 of the node 232 (through the switching device 234b and the switching device 236b), a third indirect connection between P2 of the node 230 and P2 of the node 232 (through the switching device 234b and the switching device 236b), a fourth indirect connection between P3 of the node 230 and P1 of the node 232 (through the switching device 234b and the switching device 236b), a fifth indirect connection between P4 of the node 230 and P0 of the node 232 (through the switching device 234b and the switching device 236b), and a sixth indirect connection between P5 of the node 230 and P5 of the node 232 (through the switching device 234b and the switching device 236b).

The controls to the switching devices of the line topology 134b may be provided by the management module 112 shown in FIG. 1 (e.g., as the switching instructions 114).

Figure 4A:
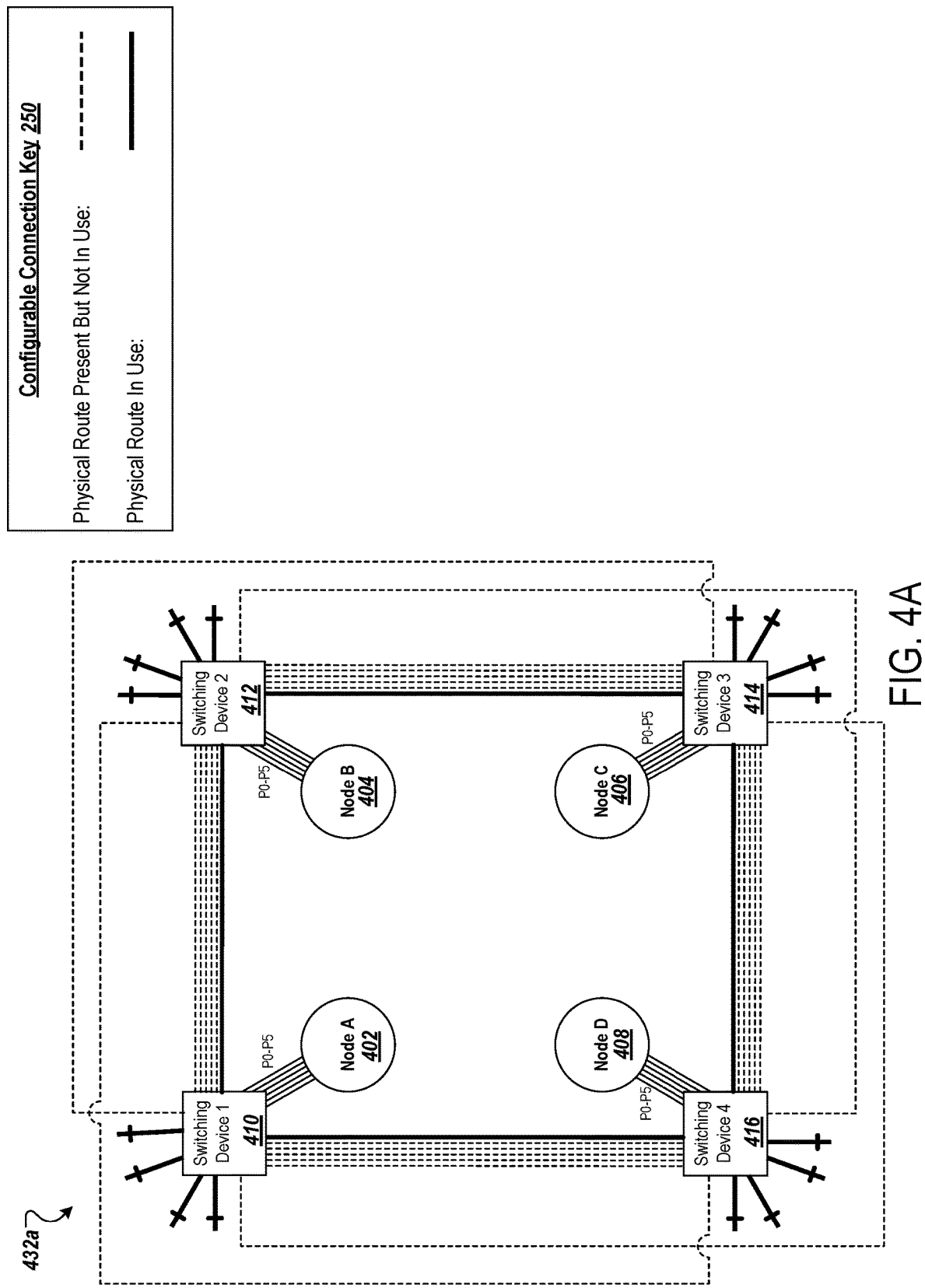
FIG. 4A is a diagram that illustrates an example circuit schematic for a four-node topology in a scalability-optimized network configuration.
Figure 4B:
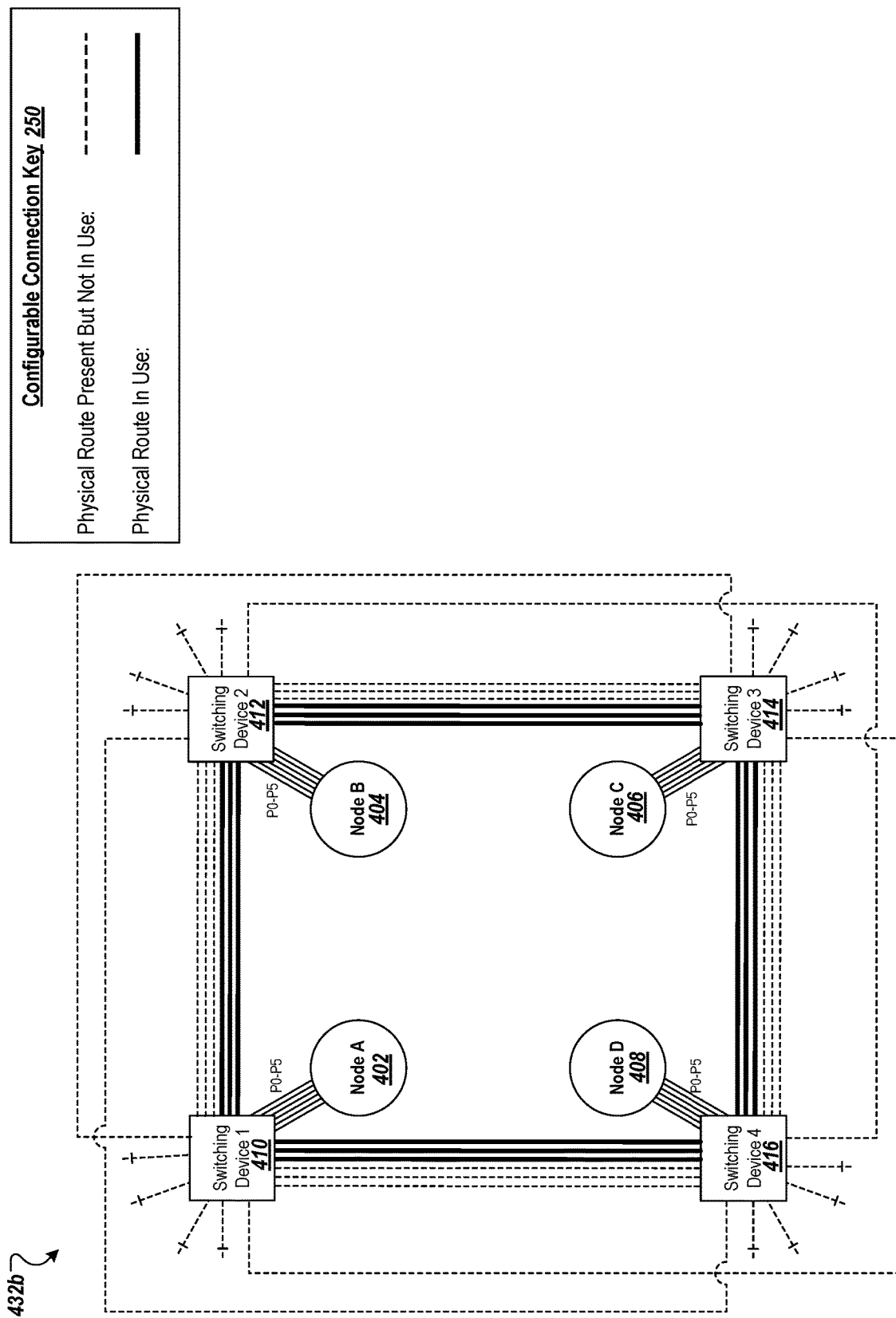
FIG. 4B is a diagram that illustrates an example circuit schematic or four-node topology in a bandwidth-optimized network configuration.

FIGS. 4A-4C show additional examples of topologies corresponding to those of FIGS. 2A-2C. By contrast with the examples of FIGS. 2A-2C, there is no dedicated connection between the four nodes in the square grid shown. Instead, each processing node has each of its six data ports (e.g., P0-P5) routed to its corresponding switching device. This allows all of the ports of a processing node to be switched by the corresponding switching device. In addition, the examples of FIGS. 4A-4C show that there are six routes between pairs of switching devices. This allows up to six concurrent connections between two nodes for a 2×1×1 topology.

Although not illustrated, additional outgoing routes from the switching devices can be provided.

FIG. 4A is a diagram that illustrates an example circuit schematic for a four-node topology in a scalability-optimized network configuration. A square (2×2×1) nodal topology 432a is shown having a scalability-optimized network configuration.

FIG. 4B is a diagram that illustrates an example circuit schematic or four-node topology in a bandwidth-optimized network configuration. As shown, the example schematic depicts the various input, output, and port connections for the square topology 432b in the bandwidth-optimized network configuration.

FIG. 4C is a diagram that illustrates an example circuit schematic for a four-node topology in a latency-optimized network configuration. As shown, the example schematic depicts the various input, output, and port connections for the square topology 432c in the latency-optimized network configuration.

FIG. 5 is a diagram that illustrates various network configuration profiles for different nodal topologies. These configuration profiles are depicted in a table 502. In some cases, the table 502 is a lookup table that is referenced by the management module 112 shown in FIG. 1.

As an example, the management module 112 shown in FIG. 1 may reference the table 502 to select network configurations, determine switching controls (e.g., switching instructions), and identify corresponding nodal port connections.

As shown, each row of the table 502 corresponds to a different nodal configuration and network configuration pair. For example, a first row of the table 502 corresponds to a 2×1×1 nodal configuration (e.g., two nodes arranged in a line) in a scalability-optimized network configuration.

The profiles in the table 502 may include different network configuration information for different types of nodal topologies and corresponding network configuration types. For example, there may be a first profile for a four-node topology in a scalability-optimized network configuration, a second profile for a four-node topology in a bandwidth-optimized network configuration, and a third profile for a four-node topology in a latency-optimized network configuration. However, there may be various other profiles for other nodal topology and network configuration type pairs.

The information included in these profiles may include, for example, control data for one or more switching devices.

The control data may be used to set the network configuration for the corresponding nodal topology. As an example, the control data may be input data for one or more switching devices (e.g., multiplexers), such as the switching device 210 shown in FIGS. 2A-2C or the switching device 220 shown in FIGS. 3A-3B.

The profile information may also or alternatively include map data indicating how, for a particular nodal configuration and network configuration, node ports of a node are connected to other node ports of other nodes. As shown, a port of a particular node may be connected to a port of another on-board node, or to a port of external node (e.g., a node of another TPU chipset).

The server system 110 may refer to the profile information in the table 502 to determine how to reconfigure a nodal topology for a particular network configuration type. Notably, the profile may include controls or instructions for achieving a particular network configuration type for a particular nodal topology. The profiles may also include indications as to the port connections between ports of different nodes in the nodal topology that are required to achieve a particular network configuration. For example, if a particular job or set of jobs requires increased bandwidth and the server system 110 has assigned the job or the set of jobs to a grouping of nodes in a square nodal configuration, the server system 110 may refer to row 504 of the table 502 to identify switching device control data for a first switching device corresponding to Node A of the grouping of nodes. The server system 110 may use this control data to set the network configuration of the grouping of nodes.

Setting the network configuration of the grouping of nodes may include dynamically reconfiguring the port connections of one or more ports of the nodes in the grouping of nodes, e.g., to achieve the desired network configuration. Reconfiguring the port connections may include ceasing to use an existing connection between a port of a node of a chipset (e.g., ASIC tray comprising multiple chips, such as a circuit board or server rack) and another port of another node on the chipset, ceasing to use an existing connection between a port of a node on a chipset and a port of an node on a different chipset (e.g., second ASIC tray), initiating the use of a connection between a port of a node of a chipset (e.g., ASIC tray) and another port of another node on the chipset, and/or initiating the use of a connection between a port of a node on a chipset and a port of an node on a different chipset (e.g., second ASIC tray). However, some ports of nodes in the grouping of nodes may have dedicated connections to particular ports of other particular nodes. These dedicated connections may remain static during the network configuration process.

Figure 6:
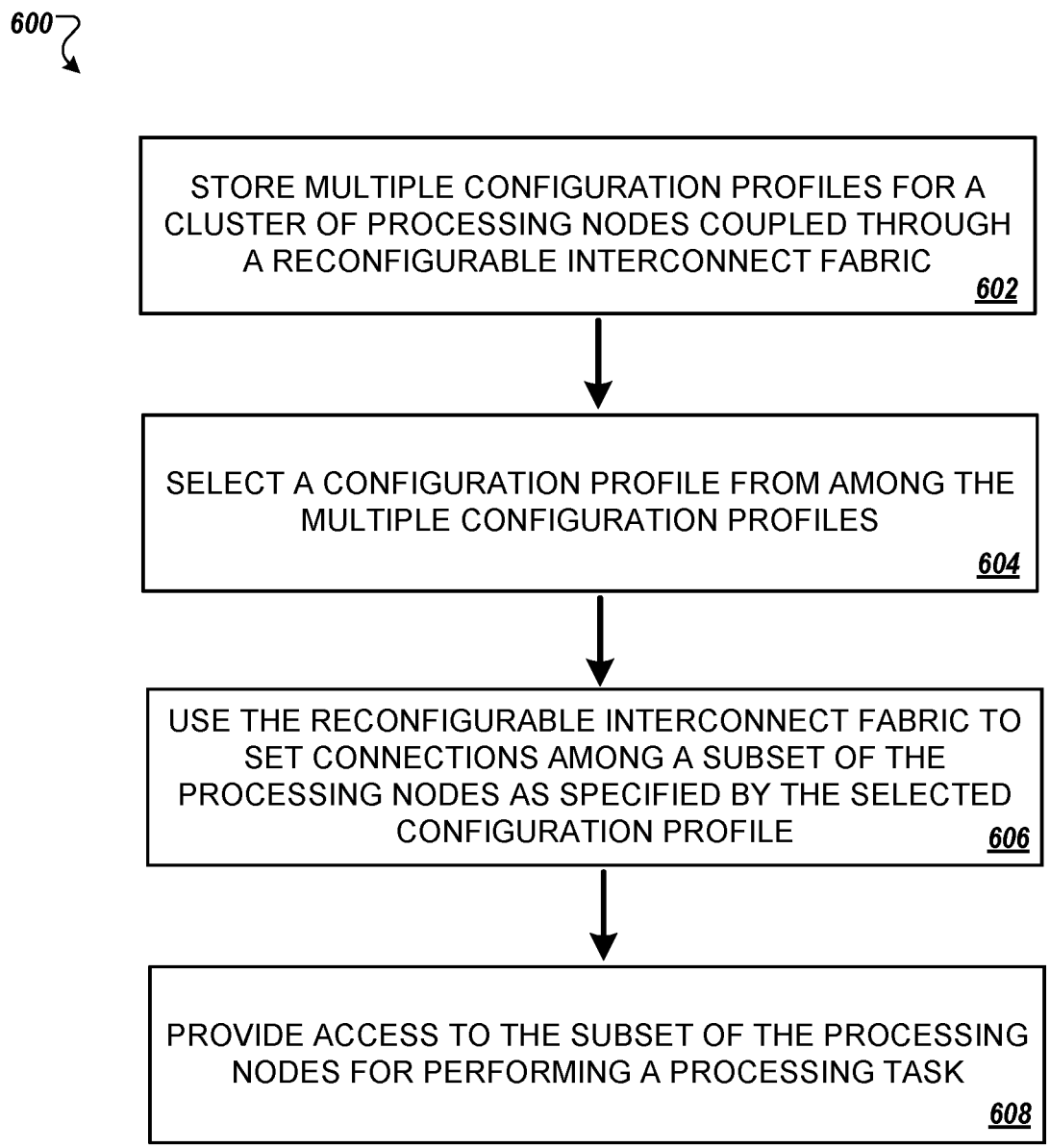
FIG. 6 is a flowchart diagram that illustrates an example process for providing a reconfigurable interconnect network.

FIG. 6 is a flowchart diagram that illustrates an example process 600 for providing a reconfigurable interconnect network. The process 600 may be performed by the server system 110 shown in FIG. 1. Specifically, the process 600 may be performed by the management module 112 of the server system 110.

The process 600 includes storing multiple configuration profiles for a cluster of processing nodes coupled through a reconfigurable interconnect fabric (602). For example, the server system 110 may store the table 502 containing various configuration profiles. The server system 110 may store the configuration profiles in a database, a cloud data warehouse, local storage, etc. The configuration profiles may each correspond to a particular nodal configuration and network configuration. The nodal configuration may indicate a nodal topology, such as a line containing two or more nodes, a square containing at least four nodes, a cube containing at least 8 nodes, etc. The network configuration may provide for different optimizations that can be achieved. As an example, for a particular nodal configuration, there may be a bandwidth network optimized configuration, a scalability optimized network configuration, and a latency optimized network configuration.

In some cases, the processing nodes each have multiple data ports. For example, with respect to FIGS. 2A-2C, each of the nodes 202, 204, 206, and 208 has six ports (e.g., ports P0, P1, P2, P3, P4, and P5). The reconfigurable interconnect fabric may include switching devices configured to programmably set connections among the data ports of the processing nodes. For example, with respect to FIGS. 2A-2C, the switching devices may include the switching devices 210, 212, and 214. The switching devices may be or include one or more multiplexers. However, other types of switching devices may be used in addition to or in place of a multiplexer.

The process 600 includes selecting a configuration profile from among the multiple configuration profiles (604). Selecting a configuration profile may include the server system 110 selecting network configuration (e.g., a type of network configuration) for a group of nodes. For example, the server system 110 may refer to the table 502 shown in FIG. 5 to identify a control data for reconfiguring the network configuration for a TPU chipset containing eight nodes arranged in a cube topology from a scalability network configuration to a latency network configuration.

In some cases, selecting the configuration profile to use for the processing task is based on at least one of: a default configuration preference; a selection of a configuration by a user; analysis of operations of the processing task; or data indicating characteristics of the processing task or one or more other processing tasks. For example with respect to FIG. 1, the server system 110 may have a default configuration preference of a scalability optimized network configuration that can be overridden if certain criteria are met (e.g., particular task priority is identified or priority threshold is met for a particular processing task) or manually overridden (e.g., based on instructions or requests received from the client device 104).

As another example, the request 106 provided by the user 102 using the client device 104 may include an indication of a particular network configuration that should be used. For example, the client device 104 may have presented to the user on a graphical user interface three interface element options, each corresponding to one or of the scalability optimized, bandwidth optimized, or latency optimized network configuration. The user 102 may have interacted with the interface to select one of the network configurations. In generating the request 106, the client device 104 may have included an indication of the user 102's selection.

As another example, the network configuration may be based on the processing task. In more detail, the client device 104 or the server system 110 may analyze the processing task to identify characteristics of the processing task and proceed to use these characteristics to identify the network configuration that should be used for a group of nodes assigned to performing the processing task. For example, in selecting a network configuration, the server system 110 may identify the computational burden imposed by the processing task and/or a priority associated with the processing task, and use these characteristics to select from scalability, bandwidth, or latency optimized. For example, if the processing task is large and size and/or otherwise requires a relatively (e.g., compared to one or more other processing tasks, compared to the typical processing task, etc.) large amount of processing power, the server system 110 may opt for the bandwidth optimized network configuration. However, if the processing task is instead requires a typical amount of processing power and is determined to be a high priority task, the server system 110 may opt for a latency optimized network configuration. The server system 110 may, for example, otherwise default to the scalability optimized network configuration.

Similarly, data indicating the characteristics may be used to select the configuration profile. For example, with respect to FIG. 1, the request 106 may indicate characteristics of the processing task. The server system 110 may use these received characteristics (e.g., instead of identifying them itself) to select from a scalability, bandwidth, or latency optimized network configuration.

In some cases, the selected configuration profile specifies a configuration in which each of the data ports of each of the processing nodes in the subset is connected to one of the other processing nodes in the subset. For example, with respect to FIG. 2B, in the bandwidth optimized network configuration, each of the data ports of each of the processing nodes 202, 204, 206, and 208 is connected to one of the other processing nodes 202, 204, 206, or 208. That is, in this network configuration for this square nodal configuration, none of the ports of any of the nodes 202, 204, 206, or 208 are connected to a data port of an external node (e.g., off chip node).

In some cases, the multiple configuration profiles include a plurality of configuration profiles that respectively specify different sets of connections among a subset of the processing nodes. For example, with respect to FIG. 5, the table 502 includes various profiles for different network configuration and nodal configuration sets. These profiles may include map data that indicates the data port connections between data ports of different nodes, including data port connections between "on-chip" nodes and "off-chip" nodes. The set of connections for each of the configuration profiles in the plurality of configuration profiles may utilize each data port of each processing node in the subset. For example, if a node has six data ports, each of these data ports may be leveraged in an active connection between a data port of another node.

In some cases, the selected configuration profile includes a routing table, for each particular processing node of the processing nodes, specifying routing information for communicating with the other processing nodes connected to the particular processing node in the configuration specified by the selected configuration profile. For example, with respect to FIG. 5, the table 502 may include, for each particular processing node, routing information for communicating with the other processing nodes connected to the particular processing node in the configuration specified by the selected configuration profile.

The process 600 optionally includes using the routing tables from the selected configuration profile to provide data among the processing nodes in the subset during the processing task. For example, the server system 110 may refer to the map data of a particular profile in the table 502 that indicates the data port connections. This map data may indicate what the active connections for each data port of each node in the corresponding subset of nodes should be in the specific network configuration.

In some cases, the multiple configuration profiles include a plurality of configuration profiles that each specify a different configuration of connections among a same number of processing nodes. For example, with respect to FIG. 5, the table 502 includes multiple profiles including three profiles shown corresponding to the square nodal configuration. One of the three profiles corresponds to a scalability optimized network configuration, a second one of the three profiles corresponds to a bandwidth optimized network configuration, and a third one of the three profiles corresponds to a latency optimized network configuration. Each of these profiles includes corresponding map data that indicates the connections among the six data ports of the nodes in the nodal configuration.

That is, the plurality of configuration profiles may include: a first configuration profile specifying a first configuration of connections; a second configuration profile specifying a second configuration having connections set to provide increased bandwidth than the first configuration; and a third configuration profile specifying a third configuration having connections set to provide lower latency than the first configuration.

In some cases, the first configuration is a torus network topology or a twisted torus network topology. The first configuration may have a single connection between pairs of processing nodes connected in the first configuration. The second configuration may have multiple connections between at least some pairs of processing nodes connected in the second configuration. Similarly, the third configuration may have multiple connections between at least some pairs of processing nodes connected in the second configuration.

In some cases, the processing nodes are organized in an n-dimensional graph, where each vertex in the graph represents one of the processing nodes and each edge in the graph represents a routing path that can be selectively enabled between the processing nodes, where n is an integer greater than zero. Here, the reconfigurable interconnect fabric may provide, for each processing node, a routing path to each neighboring processing node in the graph along axes of each of the n dimensions. The reconfigurable interconnect fabric may additionally provide, for each processing node, a routing path to each processing node that is reachable through a single step in the graph along each of two different dimensions of the n dimensions.

In some cases, the reconfigurable interconnect fabric provides, for each processing node, multiple routing paths to each neighboring processing node in the graph along axes of each of the n dimensions.

In some cases, the cluster of processing nodes is a network of machine learning accelerators.

In some cases, the processing nodes are application-specific integrated circuits (ASICs). The ASICs may be Tensor Processing units (TPUs).

The process 600 includes using the reconfigurable interconnect fabric to set connections among a subset of the processing nodes as specified by the selected configuration profile (606). Setting connections may include using one or more switching devices to provide that particular connections will be used, e.g., be used to transfer and/or receive data, over other connections. For example, with respect to FIGS. 2A-2B, in response to determining that the square topology 132a should be reconfigured from a scalability optimized network configuration shown in FIG. 2A to a bandwidth optimized network configuration shown in FIG. 2B, the server system 110 may identify control data for switching devices 210a, 212a, 214a, and 216a corresponding to the bandwidth optimized network configuration (e.g., identified from the table 502 shown in FIG. 5) and use the control data to realize the bandwidth optimized network configuration. Specifically, by providing the control data as input to the switching devices 210a, 212a, 214a, and 216a, certain connections can be "turned off" such that they are not being used for data transfer, and certain other connections can be "turned on" such that they are to be used for data transfer.

In some cases, each of the processing nodes is associated with one or more switching elements in the reconfigurable interconnect fabric that are configured to set connections of the processing node with other nodes. For example, with respect to FIG. 2A, the nodes 202, 204, 206, and 208 may be associated with the switching device 210, 212, 214, and 216, respectively. The selected configuration profile may include configuration data, for each particular processing node of the processing nodes, specifying a setting for the associated one or more switching elements of the particular processing node to achieve the configuration of the selected configuration profile. For example, with respect to FIG. 5, the table 502 may include control data for different switching devices associated with different nodes. The control data may be used by the server system 110 to programmatically reconfigure the different subsets of nodes, e.g., by providing control data as input to corresponding switching devices.

In some cases, the reconfigurable interconnect fabric is configured to selectively route data among the processing nodes over at least one of: a copper cable medium; an optical medium; or a printed circuit board (PCB) medium.

The process 600 includes providing access to the subset of the processing nodes for performing a processing task (608). For example, once the server system 110 has determined that the network configuration for a group of nodes has been updated, the server system 110 may use the group of nodes to perform the processing task. With respect to FIG. 1, the processing task may have been assigned by the server system 110. The processing task may have been based on or extracted from the request 106 provided by the client device 104.

In some cases, the processing task includes training a neural network.

The process 600 optionally includes determining a particular number of processing nodes to allocate for the processing task. For example, with respect to FIG. 1, based on the request 106 (e.g., which may indicate a particular processing task or set of processing tasks that needs to be performed), the server system 110 may identify a group of nodes. Specifically, the request 106 may indicate a processing task that needs to be performed which the server system 110 may use to select the group of nodes. The number of nodes selected may be based on, for example, the size and/or computational difficulty of the processing task (e.g., the number of nodes selected may correspond to the amount of processing power that is required), a priority associated with the processing task (e.g., more nodes may be selected if the processing task is high priority or higher priority than one or more other processing tasks in a task queue), a user associated with the processing task (e.g., more nodes may be selected if the processing task was requested by an administrator when compared to if the processing task was requested by a user without administrator authority), etc.

Here, selecting the configuration profile comprises selecting from among a plurality of the configuration profiles that each involve the particular number of processing nodes. For example, if the server system 110 determines that eight nodes are required for the processing task, the server system 110 may refer to the table 502 to identify configuration profiles associated with the cube (2×2×2) nodal configuration.

In some cases, determining the particular number of processing nodes is based on user input specifying the particular number of nodes. For example, with respect to FIG. 1, the request 106 provided to the server system 110 may indicate a number of processing nodes required for a particular processing task. The number of processing nodes may have been set by the user 102 through the client device 104. Alternatively, the client device 104 may have estimated the number of processing nodes required based on the type of processing task, the priority of the processing task, the user 102 (e.g., based on the privileges of the user 102, based on the user 102 being administrator, based on the user 102 not being an administrator, etc.), etc.

In some cases, the configuration profiles specify different configurations providing different characteristics for at least one of bandwidth, latency, and scalability. For example, with respect to FIG. 5, the configuration profiles may include map data that describes, for a particular nodal configuration and network configuration, how node ports of a node are connected to other node ports of other nodes. The profiles may include, e.g., for a particular nodal configuration, characteristics corresponding to a bandwidth optimized network configuration, latency optimized network configuration, and/or a scalability optimized network configuration. The characteristics may also include control data that is used by the server system 110 to realize the particular network configurations for a group of nodes. The control data may be or include input data for one more switching devices that are used to reconfigure the network configuration for a group of nodes.

The process 600 optionally includes allocating the subset of the processing nodes to perform the processing task separately from and concurrently with processing for other processing tasks running on other subsets of the processing nodes in the cluster. In this way a large number of groupings of processing nodes can be used to perform a variety of processing tasks.

The process 600 optionally includes concurrently using configurations from different configuration profiles for different subsets of the processing nodes performing different processing tasks. For example, the server system 110 may use a first grouping of nodes in a bandwidth optimized network configuration to perform a first processing task, and a second grouping of nodes in a latency optimized network configuration to perform a second processing task concurrently with the performance of the first processing task. The different configuration profiles may involve at least one of (i) different numbers of processing nodes or (ii) different connection topologies among the subset of processing nodes. For example, the first group of processing nodes may include four nodes in a square topology, while the second group of processing nodes may include eight nodes in a cube topology.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more computers, the method comprising:
   storing multiple configuration profiles for a cluster of processing nodes coupled through a reconfigurable interconnect fabric, the multiple configuration profiles specifying different configurations of the reconfigurable interconnect fabric to connect subsets of the processing nodes in the cluster, wherein at least some of the different configurations specified by the configuration profiles provide different numbers of connections between pairs of processing nodes to provide different levels of data transfer bandwidth between the pairs of processing nodes, and wherein the configuration profiles include, for a particular topology of processing nodes, multiple configuration profiles that provide the particular topology of processing nodes and have different connections among the processing nodes of the particular topology of processing nodes;
   determining a priority for at least one of scalability, high bandwidth, or low latency;
   selecting a configuration profile from among the multiple configuration profiles, wherein the configuration profile is selected, from among the multiple configuration profiles that provide the particular topology of processing nodes, based on the priority for scalability, high bandwidth, or low latency;
   using the reconfigurable interconnect fabric to set connections among a subset of the processing nodes as specified by the selected configuration profile; and
   providing access to the subset of the processing nodes, with connections among the subset of processing nodes as specified by the selected configuration profile, for performing a processing task.

2. The method of claim 1, comprising determining a particular number of processing nodes to allocate for the processing task;
   wherein selecting the configuration profile comprises selecting the configuration profile from among a plurality of the configuration profiles that each involve the particular number of processing nodes and specify different sets of connections among the processing nodes.

3. The method of claim 2, wherein the configuration profiles comprise multiple first configuration profiles that each involve a first number of processing nodes and each specify a different set of connections in the reconfigurable interconnect fabric such that each of the first configuration profiles connects the first number of processing nodes with different characteristics for at least one of bandwidth, latency, or scalability.

4. The method of claim 1, comprising determining an amount of processing nodes to be used for the processing task or a topology of processing nodes to be used for the processing task;
   wherein selecting the configuration profile comprises selecting the configuration profile based on the amount of processing nodes or the topology of processing nodes.

5. The method of claim 1, comprising receiving data indicating the processing task or characteristics of the processing task; and
   analyzing the processing task or the characteristics of the processing task;
   wherein selecting the configuration profile comprises selecting the configuration profile based on the analysis of the processing task or the characteristics of the processing task.

6. The method of claim 1, wherein storing the multiple configuration profiles comprises storing multiple configuration profiles that each:
   specify a network comprising a subset of the processing nodes in the cluster; and
   fully utilize input ports and output ports of each of the processing nodes in the network, including by utilizing, for at least some pairs of the processing nodes in the network, input ports and output ports of the pair of processing nodes in the pair to provide multiple concurrent data connections between the pair of processing nodes.

7. The method of claim 1, comprising:
creating separate networks of processing nodes within the cluster to concurrently run independent processing tasks for different users;
providing the different users access to the separate networks over a communication network; and
concurrently running the processing tasks specified by the different users in the separate networks.

8. The method of claim 1, wherein each of at least some of the configuration profiles comprises:
switching element settings comprising settings that set switching elements of the reconfigurable interconnect fabric to establish a particular set of physical-layer connections to form a network comprising a subset of the processing nodes in the cluster in a particular topology corresponding to the configuration profile; and
one or more routing tables that specify, for each particular processing node of the processing nodes in the network, routing information for the particular processing node to communicate with each other processing node in the network.

9. One or more non-transitory computer-readable media storing instructions that are operable, when executed by one or more computers, to cause the one or more computers to perform operations comprising:
storing multiple configuration profiles for a cluster of processing nodes coupled through a reconfigurable interconnect fabric, the multiple configuration profiles specifying different configurations of the reconfigurable interconnect fabric to connect subsets of the processing nodes in the cluster, wherein at least some of the different configurations specified by the configuration profiles provide different numbers of connections between pairs of processing nodes to provide different levels of data transfer bandwidth between the pairs of processing nodes, and wherein the configuration profiles include, for a particular topology of processing nodes, multiple configuration profiles that provide the particular topology of processing nodes and have different connections among the processing nodes of the particular topology of processing nodes;
determining a priority for at least one of scalability, high bandwidth, or low latency;
selecting a configuration profile from among the multiple configuration profiles, wherein the configuration profile is selected, from among the multiple configuration profiles that provide the particular topology of processing nodes, based on the priority for scalability, high bandwidth, or low latency;
using the reconfigurable interconnect fabric to set connections among a subset of the processing nodes as specified by the selected configuration profile; and
providing access to the subset of the processing nodes, with connections among the subset of processing nodes as specified by the selected configuration profile, for performing a processing task.

10. A system comprising:
a cluster of processing nodes;
a reconfigurable interconnect fabric to selectively connect the processing nodes, wherein the reconfigurable interconnect fabric is configured to enable multiple concurrent connections between at least some of the processing nodes;
a data storage system storing multiple configuration profiles that respectively specify different configurations of the reconfigurable interconnect fabric for subsets of the processing nodes in the cluster, wherein at least some of the different configurations provide different numbers of connections between processing nodes to provide different levels of data transfer bandwidth between pairs of processing nodes, and wherein the configuration profiles include, for a particular topology of processing nodes, multiple configuration profiles that provide the particular topology of processing nodes and have different connections among the processing nodes of the particular topology of processing nodes;
one or more computers; and
one or more non-transitory computer-readable media storing instructions that are operable, when executed by the one or more computers, to cause the one or more computers to perform operations comprising:
determining a priority for at least one of scalability, high bandwidth, or low latency;
selecting a configuration profile from among the multiple configuration profiles, wherein the configuration profile is selected, from among the multiple configuration profiles that provide the particular topology of processing nodes, based on the priority for scalability, high bandwidth, or low latency;
using the reconfigurable interconnect fabric to set connections among a subset of the processing nodes as specified by the selected configuration profile; and
providing access to the subset of the processing nodes, with connections among the subset of processing nodes as specified by the selected configuration profile, for performing a processing task.

11. The system of claim 10, wherein the processing nodes each have multiple data ports; and
wherein the reconfigurable interconnect fabric comprises switching devices configured to programmably set connections among the data ports of the processing nodes.

12. The system of claim 11, wherein the selected configuration profile specifies a configuration in which each of the data ports of each of the processing nodes in the subset is utilized with an active connection for data transfer; and
wherein each of the processing nodes is connected to provide data to each of two or more of the other processing nodes in the subset without passing the data through an intermediate processing node.

13. The system of claim 10, wherein the multiple configuration profiles include a plurality of configuration profiles that respectively specify different sets of connections among a subset of the processing nodes, wherein the set of connections for each of the configuration profiles in the plurality of configuration profiles utilizes each data port of each processing node in the subset.

14. The system of claim 10, wherein the one or more computers are configured to allocate multiple different subsets of the processing nodes in the cluster such that the different subsets are separately used to concurrently perform different processing tasks of different users.

15. The system of claim 10, wherein each of the processing nodes is associated with one or more switching elements in the reconfigurable interconnect fabric that are configured to set connections of the processing node with other nodes; and
wherein the selected configuration profile comprises configuration data, for each particular processing node of the processing nodes, specifying a setting for the associated one or more switching elements of the particular processing node to achieve the configuration of the selected configuration profile.

16. The system of claim 10, wherein the multiple configuration profiles include a plurality of configuration profiles that each specify a different configuration of connections among a same number of processing nodes.

17. The system of claim 16, wherein the plurality of configuration profiles includes:
- a first configuration profile specifying a first configuration of connections;
- a second configuration profile specifying a second configuration having connections set to provide higher bandwidth than the first configuration; and
- a third configuration profile specifying a third configuration having connections set to provide lower latency than the first configuration.

18. The system of claim 17, wherein the first configuration is a torus network topology or a twisted torus network topology, the first configuration having a single connection between pairs of processing nodes connected in the first configuration;
- wherein the second configuration has multiple connections between at least some pairs of processing nodes connected in the second configuration; and
- wherein the third configuration has multiple connections between at least some pairs of processing nodes connected in the third configuration.

19. The system of claim 10, wherein the processing nodes are organized in an n-dimensional graph, wherein each vertex in the graph represents one of the processing nodes and each edge in the graph represents a routing path that can be selectively enabled between the processing nodes, wherein n is an integer greater than one;
- wherein the reconfigurable interconnect fabric provides, for each processing node, a routing path to each neighboring processing node in the graph along axes of each of the n dimensions; and
- wherein the reconfigurable interconnect fabric additionally provides, for each processing node, a routing path to each processing node that is reachable through a single step in the graph along each of two different dimensions of the n dimensions.

* * * * *